US012039889B1

(12) United States Patent
Shasha et al.

(10) Patent No.: US 12,039,889 B1
(45) Date of Patent: Jul. 16, 2024

(54) MACHINE LEARNING OPTIMIZED STORAGE SYSTEM SIMULATION IN A VIRTUAL ENVIRONMENT

(71) Applicant: Dell Products L.P., Round Rock, TX (US)

(72) Inventors: Osnat Shasha, Holon (IL); Alex Kul, Jerusalem (IL); Shaul Dar, Petach Tikva (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/164,227

(22) Filed: Feb. 3, 2023

(51) Int. Cl.
*G09B 5/02* (2006.01)
*G06F 40/284* (2020.01)
*G09B 19/00* (2006.01)

(52) U.S. Cl.
CPC .............. *G09B 5/02* (2013.01); *G06F 40/284* (2020.01); *G09B 19/003* (2013.01)

(58) Field of Classification Search
CPC ........ G09B 5/02; G09B 19/003; G06F 40/284
See application file for complete search history.

(56) References Cited

U.S. PATENT DOCUMENTS

| | | | | |
|---|---|---|---|---|
| 9,302,170 | B2* | 4/2016 | Balakrishnan | G09B 5/02 |
| 9,501,942 | B2* | 11/2016 | Kaleal, III | G09B 19/003 |
| 9,881,511 | B1* | 1/2018 | Srinivasan | G16H 20/70 |
| 10,643,485 | B2* | 5/2020 | Ahuja | G06F 3/013 |
| 10,698,951 | B2* | 6/2020 | Cameron | G06V 30/268 |
| 10,713,963 | B2* | 7/2020 | Darnell | G09B 7/00 |
| 10,932,672 | B2* | 3/2021 | Mahalingam | A61B 5/0022 |
| 11,379,287 | B2* | 7/2022 | Neeter | G06F 11/0733 |
| 11,594,149 | B1* | 2/2023 | Edalat | G10L 25/66 |
| 11,823,587 | B2* | 11/2023 | Yen | G09B 5/02 |
| 2017/0344919 | A1* | 11/2017 | Chang | G09B 5/02 |
| 2019/0244127 | A1* | 8/2019 | Amado | A63F 9/24 |
| 2021/0217321 | A1* | 7/2021 | Lavallee | G09B 9/36 |
| 2022/0384027 | A1* | 12/2022 | Kaleal, III | A61B 5/11 |
| 2023/0252910 | A1* | 8/2023 | Carbo | G06V 40/20 |

* cited by examiner

*Primary Examiner* — Xuan M Thai
*Assistant Examiner* — Sadaruz Zaman
(74) *Attorney, Agent, or Firm* — Krishnendu Gupta; Deepika Bhayana; Derek Lam

(57) ABSTRACT

Techniques are disclosed for machine learning optimized storage system simulation in a virtual environment. For example, a system includes at least one processing device including a processor coupled to a memory; the at least one processing device being configured to implement the following steps: receiving a series of action alerts from a virtual reality system concerning a virtual reality representation of a storage system; translating each action alert in the action alert series into a corresponding storage system simulator event state, to generate a series of event states; using a machine learning model to determine a new event state based on the series of event states; generating a new event based on the new event state and on the series of event states; and updating a storage system simulation corresponding to the virtual reality representation of the storage system to display the new event in the virtual reality system.

20 Claims, 18 Drawing Sheets

MACHINE LEARNING OPTIMIZED STORAGE SYSTEM SIMULATION IN A VIRTUAL ENVIRONMENT

REFERENCE TO RELATED APPLICATIONS

This application is related to U.S. patent application Ser. No. 17/973,606, entitled "System and Method for Simulating a Storage System in a Virtual Environment" and filed Oct. 26, 2022, and U.S. patent application Ser. No. 17/732,184, entitled "VIRTUAL REALITY SIMULATIONS FOR TRAINING" and filed Apr. 28, 2022, the contents of each application of which are incorporated by reference herein in their entirety.

FIELD

Example embodiments generally relate to storage system simulation. More specifically, at least some embodiments relate to systems, hardware, software, computer-readable media, and methods for training technicians to repair or service computer systems and products.

BACKGROUND

Service provider and information technology (IT) technician human errors are considered a major problem in data centers housing storage systems. According to a recent survey, human errors account for approximately 70% of data center problems, leading to system downtime and costly security breaches. For storage systems, such errors might lead to data unavailability or, worse, data loss. This results in: a negative impact on customer business and customer satisfaction with the product; a potential increase in the chance of a customer switching to a competitor; and bad publicity. It might also result in repeated technician visits to fix the issues and high costs associated with it.

Reasons for technician errors might vary. For example, a technician may not understand and may fail to follow a procedure correctly. The technician may lack practice with specific product or may lack understanding of the equipment/product. The multiplicity of very complex products and wiring schemes may lead to confusion. A technician may not embed "lessons learned" from field cases or the technician may not have practiced certain procedures enough, especially before visiting a customer site.

Many of these can be addressed by better and more up-to-date training and practice before reaching the field. However, this is difficult because such training: 1) requires access to the lab and availability of the specific physical equipment; 2) requires having access to latest training materials for all products and the inefficiency learning from recorded sessions; and 3) requires the technician to be up-to-date with the latest "lessons learned."

SUMMARY

In one embodiment, a system comprises at least one processing device including a processor coupled to a memory, the at least one processing device being configured to implement the following steps: receiving a series of action alerts from a virtual reality system concerning a virtual reality representation of a storage system; translating each action alert in the action alert series into a corresponding storage system simulator event state, to generate a series of event states; using a machine learning model to determine a new event state based on the series of event states; generating a new event based on the new event state and on the series of event states; and updating a storage system simulation corresponding to the virtual reality representation of the storage system to display the new event in the virtual reality system.

In some embodiments, the machine learning model can be a language model. The language model can be trained by translating each event state in the event state series into a token in a language of the language model. Event states labeled as failures can be translated into failure tokens. Event states labeled as successes can be translated into success tokens. Each token can have an associated probability of being a next token in the language. Using the machine learning model can further include: translating each event state in the series of event states into a token in the language of the language model, inferring a set of next tokens and their associated probabilities based on the translated tokens in the language, and determining the new event state based on the set of next tokens and their associated probabilities. The language model can be a generative pre-trained transformer model. The at least one processing device can be further configured to filter the series of event states to omit event states that are determined to be irrelevant to the storage system simulation to identify a subset of event states. The new event can correspond to one of a stop-and-think event or a guide event for display in the virtual reality system.

Other example embodiments include, without limitation, apparatus, systems, methods, and computer program products comprising processor-readable storage media.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

Other aspects of the invention will be apparent from the following description and the amended claims.

BRIEF DESCRIPTION OF THE DRAWINGS

The foregoing summary, as well as the following detailed description of exemplary embodiments, will be better understood when read in conjunction with the appended drawings. For purposes of illustrating the invention, the drawings illustrate embodiments that are presently preferred. It will be appreciated, however, that the invention is not limited to the precise arrangements and instrumentalities shown.

To easily identify the discussion of any particular element or act, the most significant digit or digits in a reference number refer to the figure number in which that element is first introduced.

In the drawings:

FIG. 1 is an example diagrammatic view of a simulation system according to one or more example implementations;

FIG. 2 is an example diagrammatic view of a virtual reality system according to one or more example implementations;

FIG. 3 is an example diagrammatic view of a virtual reality display engine according to one or more example implementations;

FIG. 4 is an example diagrammatic view of a virtual reality environment and a storage system simulator according to one or more example implementations;

FIG. 5 is an example state sequence in a storage system simulator according to one or more example implementations;

FIG. 6 is an example diagrammatic view of a recommendation architecture according to one or more example implementations;

FIGS. 7-16 are example diagrammatic views of various virtual reality representations of a storage system according to example implementations;

FIG. 17 is an example flowchart of a simulation process according to one or more example implementations; and FIG. 18 is an example computing device or computing system according to one or more example implementations.

DETAILED DESCRIPTION

Figure 1:
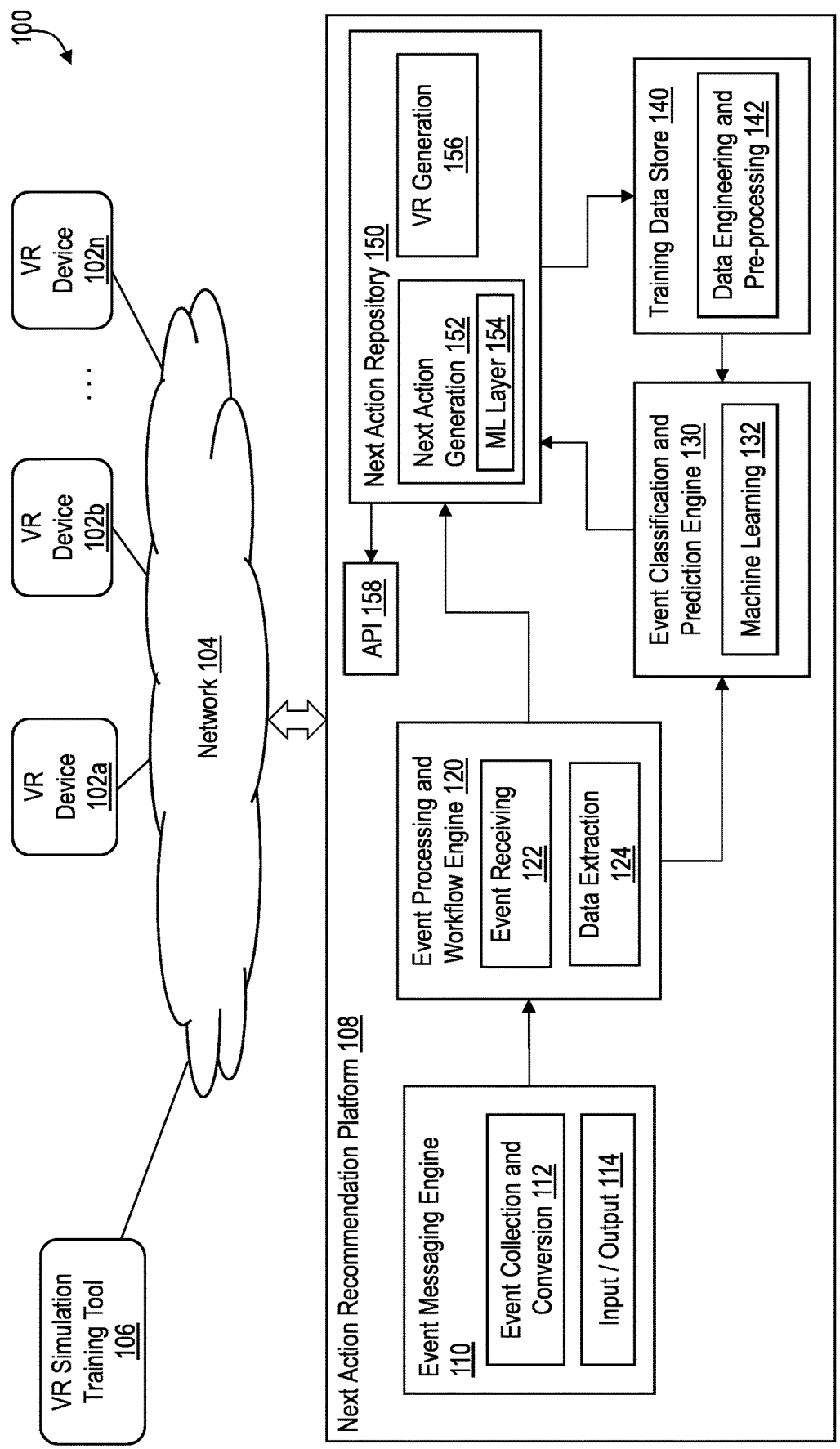

Example embodiments generally relate to storage system simulation. More specifically, at least some embodiments relate to systems, hardware, software, computer-readable media, and methods for training technicians to repair or service computer systems and products.

Disclosed herein are techniques for machine learning optimized storage system simulation in a virtual environment. In example embodiments, a simulation system may receive a series of action alerts from a virtual reality system concerning a virtual reality representation of a storage system. Each action alert is translated into a corresponding storage system simulator event state using a virtual reality logic engine, to generate a series of previous event states. A machine learning model is used to determine a new event state based on the series of previous event states. In some embodiments, the machine learning model is configured to determine a likelihood of new event states based on a sequence of previous event states in the series. The simulation system generates a new event based on the new event state and on the series of previous event states. A storage system simulation corresponding to the virtual reality representation of the storage system is updated using the new event. For example, a recommended user interaction can be displayed in virtual reality, such as a message recommending the user to stop and think before proceeding, or an indication guiding and encouraging the user to continue along the right track.

As discussed in greater detail herein, example embodiments allow for the integration of a simulated storage system with a virtual reality system. For example, example embodiments provide for effective interfacing between virtual reality systems and storage system simulators. This allows for the imitation of real storage system behavior by updating graphical user interfaces, control LEDs, alerts, etc. all within the virtual reality environment using storage system simulation information. In this manner, limitations in the programming of virtual reality systems to account for complex storage system simulations are resolved by interfacing directly with a storage system simulator. The present disclosure also infers simple interoperability between the components allowing the movement to a different simulator version (e.g., following a new product release) with minimal-to-no adaptations to the virtual reality system. This enables much simpler sustainability and reduces development costs with introduction of new releases.

Training using virtual reality can overcome the obstacles and technical problems posed by conventional methods. Simulations remove the requirement to physically access a product to gain hands-on understanding of its workings. Further, simulations remove the requirement that the user have physical access to the product, which may in limited supply or otherwise not easily available. Additionally, by simulating the environment in which the user would install, repair, or maintain a product, the user can practice performing the tasks before they are required. Gaining familiarity with products and the steps needed to address their issues increases the user's confidence in their ability to remedy problems when they arise. In fact, even when a problem surfaces, through the virtual simulations, the user can practice remedying the issue before attempting to work on the product itself. Thus, a computing device that uses virtual reality to train a user to address issues for a product can increase the likelihood of the user successfully installing, repairing, and maintaining the product, and thus improve the user's satisfaction with the product. Additionally, the present computing device can reduce the duration of the user's service visits to customer sites for repairing physical products, thereby reducing costs for the customer and for the user's employer.

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 illustrates an embodiment of a simulation system (e.g., simulation system 100). In the illustrated embodiment, the simulation system 100 includes one or more virtual reality (VR) devices (e.g., VR devices 102a, 102b, . . . , 102n, collectively, "VR devices 102"). The VR devices 102 communicate over a network 104 with a VR simulation training tool 106 and a next action recommendation platform 108.

The VR devices 102 can comprise, for example, desktop, laptop, or tablet computers, Internet of Things (IOT) devices, mobile telephones, or other types of processing devices capable of communicating with the next action recommendation platform 108 over the network 104. Such devices are examples of what are more generally referred to herein as "processing devices." Some of these processing devices are also generally referred to herein as "computers." The VR devices 102 may also or alternately comprise virtualized computing resources, such as virtual machines (VMs), containers, etc. The VR devices 102 in some embodiments comprise respective computers associated with a particular company, organization or other enterprise. The variable n and other similar index variables herein are assumed to be arbitrary positive integers greater than or equal to one.

The terms "client," "customer" or "user" herein are intended to be broadly construed so as to encompass numerous arrangements of human, hardware, software or firmware entities, as well as combinations of such entities. Storage simulation services may be provided for users utilizing one or more machine learning models, although it is to be appreciated that other types of infrastructure arrangements could be used. At least a portion of the available services and functionalities provided by the next action recommendation platform 108 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

One or more input-output devices such as keyboards, displays or other types of input-output devices may be used to support one or more user interfaces to the next action recommendation platform 108, as well as to support communication between the next action recommendation platform 108 and connected devices (e.g., VR devices 102) and/or other related systems and devices, as discussed in further detail in connection with FIG. 2.

In some embodiments, the VR devices 102 are assumed to be associated with repair technicians, system administrators, information technology (IT) managers, or other authorized personnel configured to access and utilize the next action recommendation platform 108.

The present next action recommendation platform 108 is assumed to be accessible to the VR devices 102, and vice-versa, over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The next action recommendation platform 108, on behalf of respective infrastructure tenants each corresponding to one or more users associated with respective ones of the VR devices 102, provides a platform for recommending a next action in a virtual reality representation of a storage system.

The next action recommendation platform 108 includes an event messaging engine 110, an event processing and workflow engine 120, an event classification and prediction engine 130, a training data store 140, and a next action repository 150. The event messaging engine 110 includes an event collection and conversion component 112, and an input/output (I/O) component 114. The event processing and workflow engine 120 includes an event receiving component 122 and a data extraction component 124. The event classification and prediction engine 130 includes a machine learning (ML) component 132. The training data store 140 includes a data engineering and pre-processing component 142. The next action repository 150 includes a next action generation component 152 and a VR generation component 156, and provides an application programming interface (API) 158. The next action generation component 152 includes an ML layer 154.

The event messaging engine 110 receives event-based data over network 104 from, for example, VR simulation training tool 106. The event-based data can include, without limitation, action alert event information relating to actions that the user has taken within the virtual reality representation of the storage system. Upon occurrence of an event, the event collection and conversion component 112 of the event messaging engine 110 receives an event message from the VR simulation training tool 106 including event-based data having, for example, one or more attributes and corresponding information (e.g., metadata) about storage parts and/or object models (e.g., of storage or other hardware) to which the attributes were added or in which the attributes were modified.

The event messaging engine 110 provides an interface layer for communications with the VR simulation training tool 106. Inbound or outbound communications involving multiple types of messages, pass through the event messaging engine 110 before and after being processed by the next action recommendation platform 108. The input/output component 114 provides interfaces for VR simulation training tool 106 to access the next action recommendation platform 108 and for VR devices 102 to receive outputs from the next action recommendation platform 108. The input/output component 114 further receives and processes incoming events (e.g., action alert events) from VR simulation training tool 106. For example, when a new action is taken or a new attribute is added to an object model, an event is triggered and an event message is automatically sent to the event messaging engine 110. At least a portion of the event messaging engine 110 may comprise a distributed event store and stream-processing platform such as, for example, Apache® Kafka® available from the Apache Software Foundation of Wilmington, Delaware. The event messaging engine 110 provides a unified, high-throughput, low-latency platform for handling real-time data feeds.

As explained in further detail herein, the input/output component 114 also receives and processes queries for next action recommendations directed to the next action repository 150 from, for example, VR devices 102 and/or the VR simulation training tool 106. The input/output component 114 receives and processes outgoing responses to the queries and causes transmission of the responses to the VR devices 102 and/or the VR simulation training tool 106. The input/output component 114 includes one or more APIs to interface with the different elements of the next action recommendation platform 108, the VR devices 102 and/or the VR simulation training tool 106. The input/output component 114 in combination with the event collection and conversion component 112 facilitates interactions between devices of multiple types (e.g., physical, virtual, mobile, desktop) through multiple mediums (e.g., web, cellular, satellite, etc.). For example, the input/output component 114 in combination with the event collection and conversion component 112 standardizes and formats communications based on different interface types.

The event receiving component 122 of the event processing and workflow engine 120 receives the processed event-data from the event messaging engine 110. The data extraction component 124 extracts information relevant to event classification (e.g., for use in identifying action alert event sequences that lead to failure or success terminal events). Example relevant information can include, without limitation, bad event states that resulted in a terminal event involving a major alert denoting an undesired malfunction, such as system unavailable, data unavailable or data lost, or performance degraded.

The training data store 140 includes a data engineering and data pre-processing component 142, which according to an embodiment, performs data engineering and data pre-processing to identify features and data elements that will be influencing the next action data predictions. In illustrative embodiments, the data engineering and data pre-processing includes determining and tracking statistics about sequences of action alert events that resulted in the system 100 entering a failure or success state, to identify the significance of each feature in a training dataset, and filter less important data elements. For example, such data engineering and data pre-processing can help identify event sequences that represent common errors or common successes when training or operating the storage system simulation. The data engineering and data pre-processing reduces the dimensions and complexity of the model, hence improving the accuracy and performance of the model. In some embodiments, the data engineering and data pre-processing component 142 filters and extracts relevant subsets of action alert sequences, to identify event states that can safely be removed or omitted as irrelevant to the system 100 reaching a terminal action alert event, such as a failure or success result. Once the data is ready for use as training data, the training data is input to the training component of the ML layer 132.

Once new action recommendation is successfully performed on a given action alert sequence, the next action recommendation is stored in the next action repository 150 along with the relationships and other elements and/or attributes for governance and queries. The next action repository 150 stores and manages action alert event data elements and their relationships to other elements in a central manner for scalability, high performance and fast access. The other elements may include, for example, other attributes that include state information or do not include state information. For example, the next action repository 150 can store related action alerts, such as different action alerts common to given action alert sequences, or action alerts related by terminal event (e.g., failure or success alerts, etc.).

The next action repository 150 comprises a next action generation component 152, which includes an ML layer 154 that uses one or more machine learning techniques to build event state sequences corresponding to action alert events and their relationships to other elements, as described in greater detail herein. The VR generation component 156 uses the event state sequences and associated next actions to generate visual indicators for display in a storage system simulation, such as in virtual reality for an enterprise or other entity.

Figure 2:
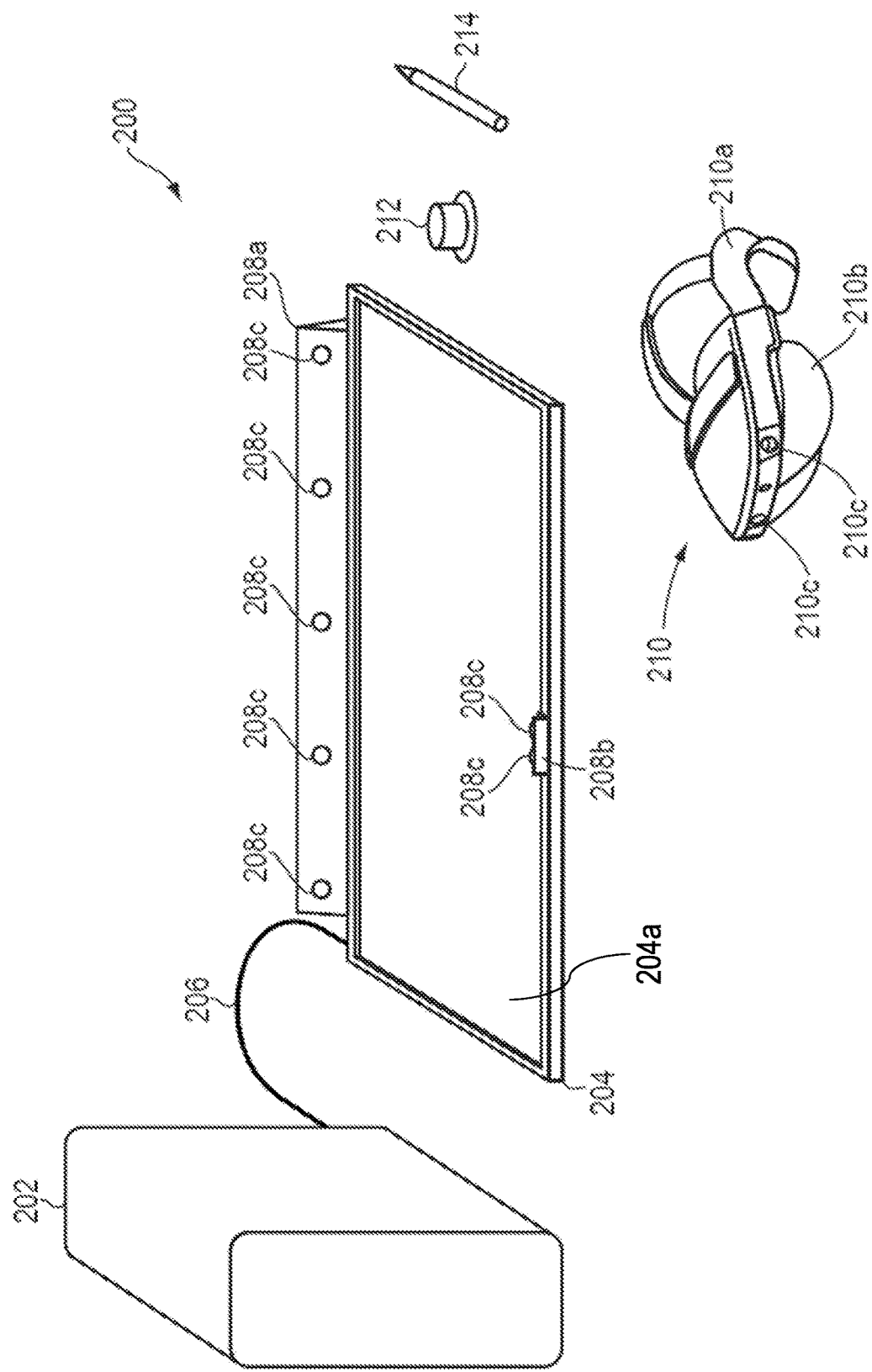

Referring now to FIG. 2, an embodiment of a virtual reality system (e.g., virtual reality system 200) is illustrated that may be a virtual reality device 102 discussed above with reference to FIG. 1. In the illustrated embodiment, the virtual reality system 200 includes a computing device (e.g., computing device 202). While the computing device 202 is illustrated as a desktop computing device, other types of computing devices (e.g., laptop/notebook computing devices and/or other mobile computing devices, computing devices integrated into other components of virtual reality system 200, and/or other types of computing devices) will fall within the scope of the present disclosure as well. As discussed in further detail below, computing device 202 may be coupled to other components of virtual reality system 200 via wired and/or wireless couplings.

For example, virtual reality system 200 of the illustrated embodiment includes a physical display device (e.g., physical display device 204) that is connected to computing device 202 by a wired connection (e.g., wired connection 206), although wireless connections between computing device 202 and physical display device 204 (or integration of at least some of the computing device functionality discussed below in physical display device 204) will fall within the scope of the present disclosure as well. Physical display device 204 includes a display screen (e.g., display screen 204a) that, in the embodiments illustrated and discussed below, is provided in a substantially horizontal orientation relative to a user of virtual reality system 200, as well as substantially parallel to the support surface upon which it is located (e.g., a working surface of a desk). For example, one of skill in the art in possession of the present disclosure will recognize that display screens have been traditionally provided in substantially vertical orientations relative to users, as well as substantially perpendicularly to their support surfaces (e.g., the working surface of the desk discussed above), and that display screen 204a of physical display device 204 is described below as provided in a substantially horizontal orientation that is rotated substantially ninety degrees from those substantially vertical orientations. For example, physical display device 204 may be provided as part of a "smart desk" that provides a horizontally oriented, touch-input display device (which may be utilized by itself or in conjunction with a vertically oriented display device), although other horizontally oriented display screens will fall within the scope of the present disclosure as well. Furthermore, the provisioning of physical display device 204 and display screen 204a in other orientations (e.g., the vertical orientation discussed above) will fall within the scope of the present disclosure as well.

In the illustrated embodiment, a user tracking subsystem (e.g., user tracking subsystems 208a, 208b) is integrated with physical display device 204, although a user tracking subsystem that is separate from physical display device 204 (and separately coupled to computing device 202 via a wired or wireless connection) will fall within the scope of the present disclosure as well. As such, in some embodiments user tracking subsystem 208a, 208b may include at least some of the computing device functionality described below for the physical display device 204. User tracking subsystem 208a, 208b may include a plurality of user tracking devices (e.g., user tracking device 208c) that may be provided by infrared (IR) sensors, IR sensor arrays (e.g., "IR castors"), three-dimensional cameras (e.g., if the processing system in the computing system has sufficient processing capabilities), and/or a variety of other user tracking devices that would be apparent to one of skill in the art in possession of the present disclosure. While virtual reality system 200 is illustrated with user tracking subsystem 208a positioned at the "top" of physical display device 204 and the user tracking subsystem 208b positioned at the "bottom" of physical display device 204, user tracking subsystems with different numbers of components in different configurations and/or orientations will fall within the scope of the present disclosure as well.

In the illustrated embodiment, a virtual reality display subsystem (e.g., virtual reality display subsystem 210) is included with virtual reality system 200, and provides a head-mounted user tracking and display subsystem. For example, virtual reality display subsystem 210 includes a chassis (e.g., chassis 210a) that is configured to be worn on a user's head such that a display device (e.g., display device 210b) is positioned in front of the user's eyes. In the discussions below, display device 210b is provided by a transparent Organic Light Emitting Device (OLED) display device, although other display devices that provide the functionality discussed below may fall within the scope of the present disclosure as well. The virtual reality display subsystem 210 may also include a plurality of cameras (e.g., cameras 210c) that are configured to capture images in the field of view of a user wearing virtual reality display subsystem 210. In the examples discussed below, virtual reality display subsystem 210 is wirelessly coupled to computing device 202, although wired connections will fall within the scope of the present disclosure as well. While in the embodiments discussed below, much of the computing device processing for the display of images by virtual reality display subsystem 210 is performed by computing device 202 in order to provide a relatively small and lightweight virtual reality display subsystem 210, in other embodiments virtual reality display subsystem 210 may perform at least some of the computing device functionality discussed below. While not explicitly illustrated, virtual reality display subsystem 210 may include a variety of other components for use in the user tracking functionality discussed below, including IR markers (e.g., for use by IR sensors or IR sensor arrays in user tracking subsystem 208a, 208b), accelerometers, gyroscopes, locations sensors, and/or a variety of other tracking components that would be apparent to one of skill in the art in possession of the present disclosure. In experimental embodiments, virtual reality display subsystem 210 was provided by a META® headset provided by META® company of California, United States, although other virtual reality display subsystems will fall within the scope of the present disclosure as well. However, while a specific virtual reality display subsystem has been described, it is recognized that light field display devices, projection display devices, and/or other virtual reality display subsystems may be substituted for virtual reality display subsystem 210 while remaining within the scope of the present disclosure.

In the illustrated embodiment, virtual reality system 200 also includes a totem device (e.g., totem device 212) and a pen device (e.g., pen device 214), each of which may be wirelessly connected to computing device 202 (although wired connections will fall within the scope of the present disclosure as well), or capable of being tracked by virtual reality display subsystem 210 and/or user tracking subsystem 208a, 208b. Furthermore, each of totem device 212 and pen device 214 may include tracking components such as IR markers (e.g., for use by IR sensors or IR sensor arrays in user tracking subsystem 208a, 208b), cameras, accelerometers, gyroscopes, locations sensors, and/or a variety of other tracking components that would be apparent to one of skill in the art in possession of the present disclosure. While a specific virtual reality system has been described, one of skill in the art in possession of the present disclosure will recognize that virtual reality systems may include a variety of components in a variety of different configurations in order to provide for conventional virtual reality workspace functionality, as well as the functionality discussed below, while remaining within the scope of the present disclosure.

Figure 3:
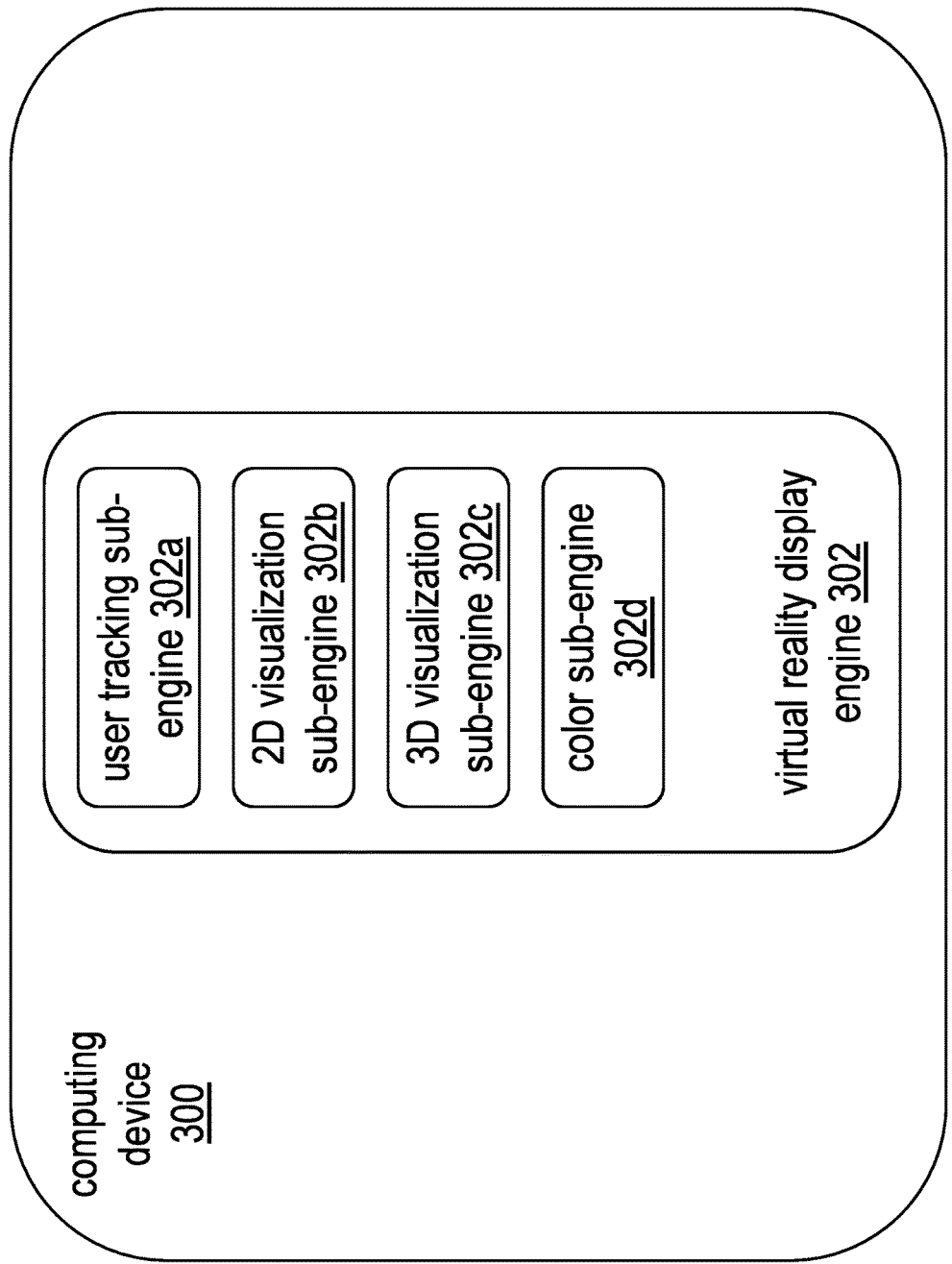

Referring also to FIG. 3, an embodiment of a computing device (e.g., computing device 300) is illustrated that may be computing device 202 discussed above with reference to FIG. 2. Furthermore, as discussed above, while a separate computing device 300 is illustrated in FIG. 3, the functionality of the computing device 300 may instead by provided by a computing system that may be at least partially distributed across the components of virtual reality system 200. In the illustrated embodiment, computing device 300 includes a processing system and a memory system that is coupled to the processing system and that includes instructions that, when executed by the processing system, cause the processing system to provide a virtual reality display engine (e.g., virtual reality display engine 302) that is configured to perform the functions of the virtual reality display engines and computing devices discussed below. However, as discussed above, rather than being provided in a separate computing device, the functionality and/or processing performed by the computing device as discussed below may instead be integrated into components of virtual reality system 200 (e.g., physical display device 204, user tracking subsystem 208a, 208b, virtual reality display subsystem 210, etc.) while remaining within the scope of the present disclosure.

In the illustrated embodiment, virtual reality display engine 302 includes a user tracking sub-engine (e.g., user tracking sub-engine 302a) that may be configured to utilize user tracking information to determine the position of the user (e.g., the user's head, the user's hands, and/or other portions of the user), a two-dimensional visualization sub-engine (e.g., two-dimensional visualization sub-engine 302b) that may be configured to generate the two-dimensional elements on display screen 204a of the physical display device 204, a three-dimensional visualization sub-engine (e.g., three-dimensional visualization sub-engine 302c) that may be configured to generate the virtual reality elements via the virtual reality display subsystem 210, and a color sub-engine (e.g., color sub-engine 302d) that may be configured to determine color details of the two-dimensional and virtual reality elements generates by two-dimensional visualization sub-engine 302b and three-dimensional visualization sub-engine 302c. However, while an example of specific sub-engines and components of virtual reality display engine 302 have been illustrated and are described in more detail below, one of skill in the art in possession of the present disclosure will recognize that virtual reality display engine 302 may include more or fewer sub-engines, and those sub-engines may be distributed across multiple different components of the virtual reality system 200 (e.g., user tracking sub-engine 302a provided in user tracking subsystem 208a, 208b, two-dimensional visualization sub-engine 302b provided in physical display device 204, the three-dimensional visualization sub-engine 302c provided in virtual reality display subsystem 210, etc.) while remaining within the scope of the present disclosure.

Figure 4:
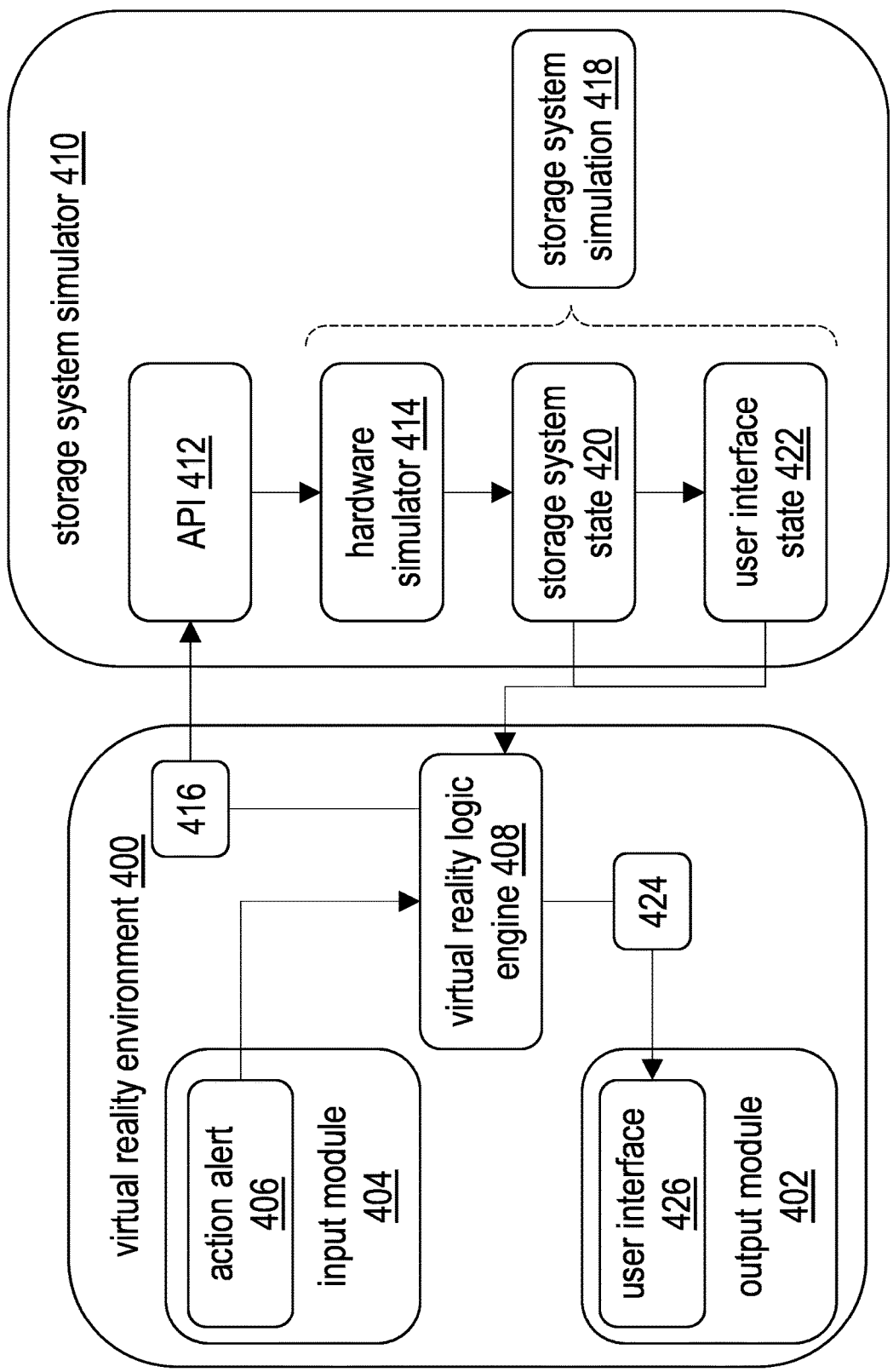

FIG. 4 depicts exemplary modules that are executed by the virtual reality system 200 to provide a virtual reality representation of a storage system. For example, the virtual reality system may launch a virtual reality environment (e.g., virtual reality environment 400). In some implementations, the virtual reality system launches virtual environment 400 in response to a particular selection of a storage system to simulate and/or a particular training module to provide training for a particular product. The virtual reality environment 400 includes an output module 402 coupled to physical display device 204 and/or the virtual reality display subsystem 210. After retrieving data specific to the product from a data model, the virtual reality system uses at least 2D and/or 3D visualization sub-engines 302b, 302c of virtual reality display engine 302 to simulate virtual reality environment 300 in which the user can interact with a virtual reality representation of the storage system, which output module 402 sends to physical display device 204 and/or virtual reality display subsystem 210.

In some implementations, virtual reality environment 400 includes an input module (e.g., input module 404). Input module 404 is coupled to various input devices described above. For example, input module 404 may be coupled to user tracking devices 208c such as infrared (IR) sensors, IR sensor arrays (e.g., "IR castors"), or three-dimensional cameras. Additional input devices may include a totem device 212 that the user may hold, virtual reality gloves (not shown) for the user to wear, and/or a pen device 214 the user may deploy to select items on a touchscreen display. In some implementations, the virtual reality system may monitor various signals (i.e., action alerts) from virtual reality environment 400.

In some implementations, the virtual reality system provides a virtual reality representation of a storage system. For example, the virtual reality representation of the storage system and the storage system simulation may be associated with a training program for a product. For example, to train the user, a training program may be executed in connection with virtual reality environment 400 by outputting instructions to guide the user in performing various tasks on a virtual representation of a storage system and a storage system simulation. After each instruction is displayed, an event handler of input module 404 waits for the user to complete the requested action. The input module 404 interprets signals from input devices, and when the signals amount to a known action, an action alert is sent to the event handler to process. The event handler uses data from a data model to determine if the action satisfies or fails the instruction presented to the user. As will be discussed in greater detail below, the virtual reality system may update a storage system simulation state and/or a user interface state for a user interface of the virtual reality representation of the storage system to recommend a next action based on the action alert.

Figure 5:
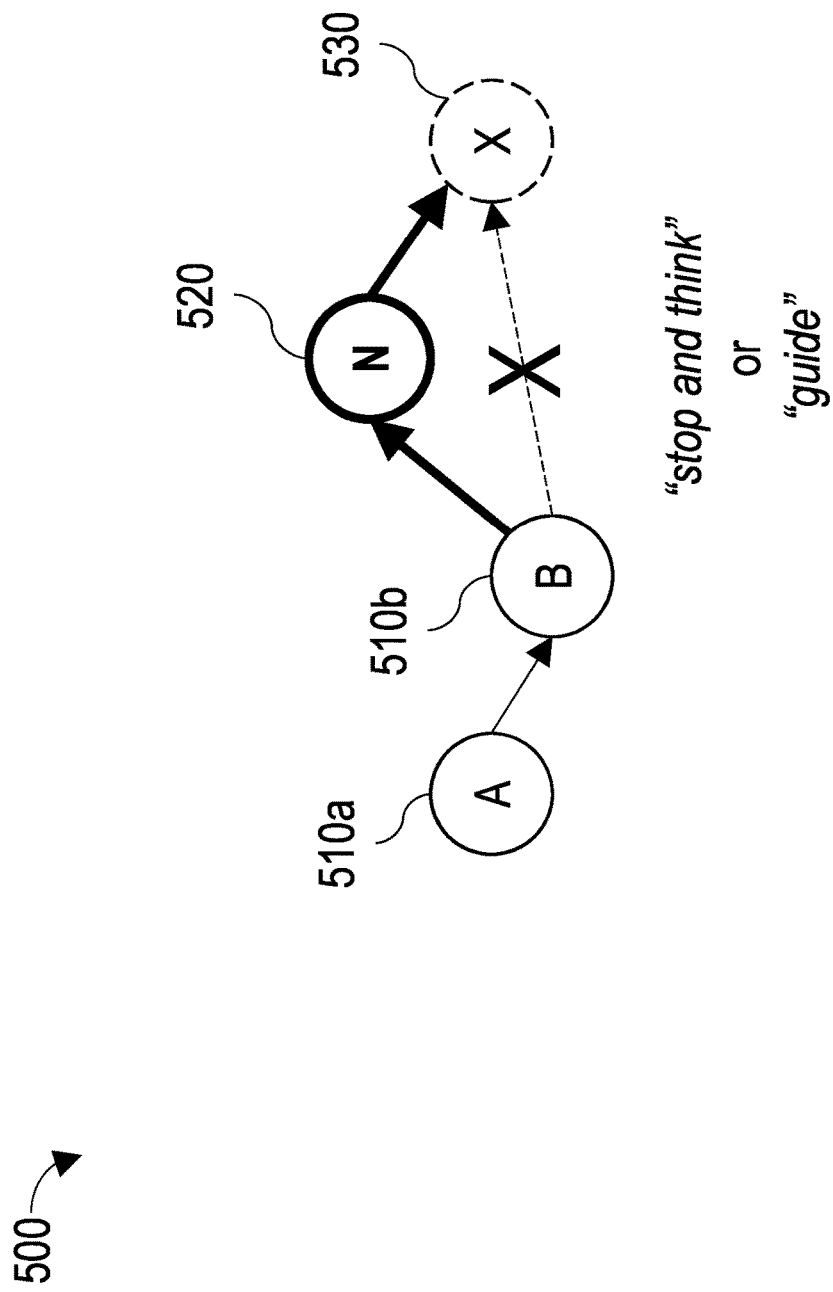

FIG. 5 depicts an exemplary state sequence 500 that is analyzed by the simulation system 100 to recommend a next action in a virtual reality representation of a storage system.

In some implementations, simulation system 100 receives a selection of a storage system simulation from a plurality of storage system simulations corresponding to physical storage systems. For example, simulation system 100 may provide a user interface configured to display various configurations for storage system simulations that a user may customize. In some implementations, the storage system simulation may be predefined for a particular training exercise from a menu or listing of many storage system simulations and/or training exercises associated with multiple storage system simulations. In one example, a user may select the storage system simulation that corresponds to a physical storage system installed at a particular site. In this manner, the user may use the combination of a virtual reality representation of the storage system and the storage system simulation to practice various exercises on the storage system corresponding to the physical storage system installed at a particular site.

As discussed in greater detail herein, based on the storage system simulation and a series of action alerts, simulation system 100 generates a recommended next action for the user. The next action is sent to the output module 402 of the virtual reality environment 400, to update the display on the physical display device 204 and/or the virtual reality display subsystem 210.

For example, if the input series of action alerts is predicted to lead to an unsatisfactory result, then the virtual reality environment 400 may display a visual indicator including guidance determined based on the recommended next action. In example embodiments, the guidance may include instructions recommending the user to stop (e.g., pause) and think about the current state of the storage system simulation in light of the series of action events that led to the current state. In some embodiments, the guidance may further include an explanation of why the user's sequence of inputs thus far was incorrect and/or inadequate, and provide more detailed guidance on how to complete the task. In another example, if the input series of action alerts is predicted to lead to a satisfactory result, then the virtual reality environment 400 may display a visual indicator including guidance determined based on the recommended next action. In example embodiments, the guidance may include instructions guiding the user to a recommended next action predicted to achieve the satisfactory result, based on the current state of the storage system simulation and the series of action events that led to the current state. In some embodiments, the guidance may further include visualizing the storage product under simulation in a future state ready for a next task to be performed.

In example embodiments, the simulation system 100 receives a series of action alerts, and translates each action alert into a corresponding event state. This translation generates a series of event states (e.g., event state sequence 500). For example, simulation system 100 can receive a sequence including two action alerts and translate each action alert into a corresponding state A 510a and state B 510b.

In example embodiments, the simulation system 100 predicts, based on the series of event states, that the state sequence including states A and B 510a, 510b is likely to lead to a final state X 530. Example final states 530 can include, without limitation, an unsatisfactory state or a satisfactory state.

In example embodiments, the simulation system 100 determines a new event state 520 based on the series of event states 510a, 510b. In the illustrated example, the simulation system 100 determines a new event state N 520. The new event state can be inserted between, for example, the most recent event state 510b in the series and the predicted final event state 530.

In example embodiments, the simulation system 100 generates a new event based on the new event state 520 and on the series of event states. For example, the new event can be a stop-and-think indication if the final state 530 is predicted to be an unsatisfactory state. Alternatively, the new event can be a guide indication if the final state 530 is predicted to be a satisfactory state.

In example embodiments, the simulation system 100 updates the storage system simulation 418 to display the new event in the virtual reality environment. For example, for a stop-and-think indication, the simulation system 100 can display a pop-up or other visualization encouraging the user to pause and consider the current state of the storage system simulation along with the sequence of action alerts, before continuing with the likely next action in the current sequence of action alerts. In some embodiments, the visualization can include an indicator or prediction of what is likely to happen if the user proceeds. Alternatively, for a guide indication, the simulation system 100 can display an indication guiding the user thereby encouraging the user to continue with the likely next action that is predicted to lead to the satisfactory state.

Figure 6:
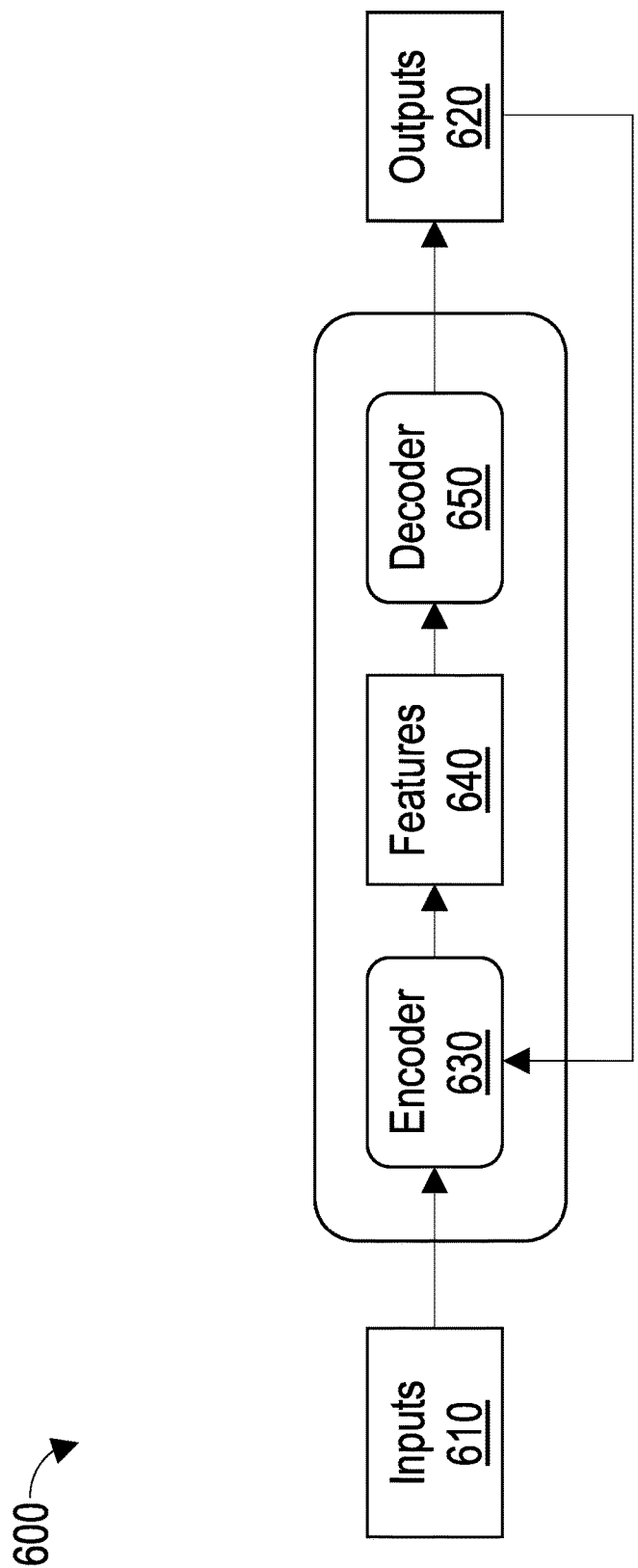

FIG. 6 depicts an exemplary architecture 600 that is executable by the simulation system 100 to recommend a next action in a virtual reality environment 400 providing a simulation 418 of a storage system (e.g., a virtual reality representation of a storage system). For example, the recommendation architecture 600 is configured to receive inputs 610 and generate outputs 620. In a training phase, the recommendation architecture 600 is configured to use an encoder 630 to learn appropriate features 640 that can be used to predict the next action in the sequence. In an inference phase, the recommendation architecture 600 is configured to use a decoder 650 to predict the next action in the sequence as an example output 620.

Example inputs 610 can include, without limitation, a series of action alerts from the user. In a training phase, the encoder 630 can include a ML model that is trained based on action alerts representing usage of the virtual reality representation of the storage system that is tracked from a plurality of technicians. Example tracked usage can include, without limitation, recording some or all actions taken, some or all state transitions, and some or all resulting final states.

In example embodiments, the ML model is a language model and the recommendation architecture 600 is configured to transform the action alerts into corresponding tokens (e.g., symbols) in the language. An unsatisfactory state can be represented as a "failure" token having a predetermined meaning and termination status. Likewise, a satisfactory state can be represented as a "success" token also having a predetermined meaning and termination status. Example language models can include, without limitation, generative pre-trained transformer models such as GPT-2, GPT-3, GPT-3.5, or GPT-4, provided by OpenAI of California, United States.

In example embodiments, in a training phase the encoder 630 is configured to train an ML model on the language tokens to learn features 640 relevant to identifying (e.g., predicting) failure or success tokens as the next token in the language, based on the token sequence corresponding to the inputs 610 in the language. In some embodiments, the encoder 630 is configured to learn bad event states based on the action alerts. Example bad event states can include, without limitation, states that correspond to the simulated system becoming unavailable, data becoming unavailable or lost, or performance degradation in the simulated system. In other embodiments, the encoder 630 is configured to learn good event states based on the action alerts. The good event states can indicate, for example, states where the problem being simulated was resolved successfully.

In some embodiments, the encoder 630 is configured to calculate and track features such as statistics in connection with sequences of action alerts that resulted in the simulated system entering the bad event state. Example statistics can include, but are not limited to, measures of the probability or frequency with which a given event state transitions to a next event state, or the probability that a particular event state generally correlates with a given set or sequence of event states. In other embodiments, example features can include a duration of each action alert in a given sequence, thereby allowing the recommendation architecture 600 to analyze and learn sequences of corresponding event states including a predicted duration for completion of a given action alert sequence. Based on this training data, the recommendation architecture 600 is configured to learn appropriate features 640 that can be used to infer a next action based on a user's sequence of action alerts during an inference phase. These features 640 can also be used to retrain the ML model and generate an improved ML model. In further embodiments, the outputs 620 can also be used to retrain and improve the ML model in future iterations.

In example embodiments, in an inference phase the decoder 650 is configured to use the trained ML model to infer or predict an output 620 next event state, based on the input 610 sequence of action alerts from the user. For example, the decoder 650 can receive one or more predicted next tokens in the language from the language model based on translating the series of action alerts into a corresponding event state, and generating a series of language tokens from the event states. Accordingly, the decoder 650 can use each of the predicted next tokens in the language to determine a corresponding new event state.

In some embodiments, the output 620 from the ML model can also include probabilities associated with each predicted next token. The probabilities can indicate, for example, a probability that a given token will be next in sequence, given the generated language tokens and their associated features. Accordingly, if a next token is a failure or success token that predicts termination of the sequence of event states and the associated probability exceeds a predetermined threshold, then the recommendation architecture 600 is configured to generate a new event based the new event state and on the series of event states corresponding to the series of action alerts. In this way, the recommendation architecture 600 can be configured to generate and recommend a new event whose probability reflects, for example, a common or a most common approach used among the field of trainees, based on the likelihood or probability features. In other embodiments, if the associated features include durations of each action alert, then the recommendation architecture 600 is able to generate a new event that attempts to minimize an overall duration of the action alert series. In this way, the recommendation architecture 600 can be configured to generate and recommend a new event where the overall duration of the action alert series reflects, for example, a shortest sequence of event states or action alerts, thereby advantageously reducing maintenance costs when the skills learned in the storage system simulation are transferred into the field.

The recommendation architecture 600 is configured to update the storage system simulation 418 to display the new event in the virtual reality representation, based on the new event. For example, if the next token is a failure token, then the storage system simulation 418 can display a stop-and-think pop-up or other visual or auditory indication. In other embodiments, if the next token is a success token, then the storage system simulation 418 can display a guide message or other visual or auditory indication encouraging the user to proceed along the predicted sequence of action alerts.

Figure 7:
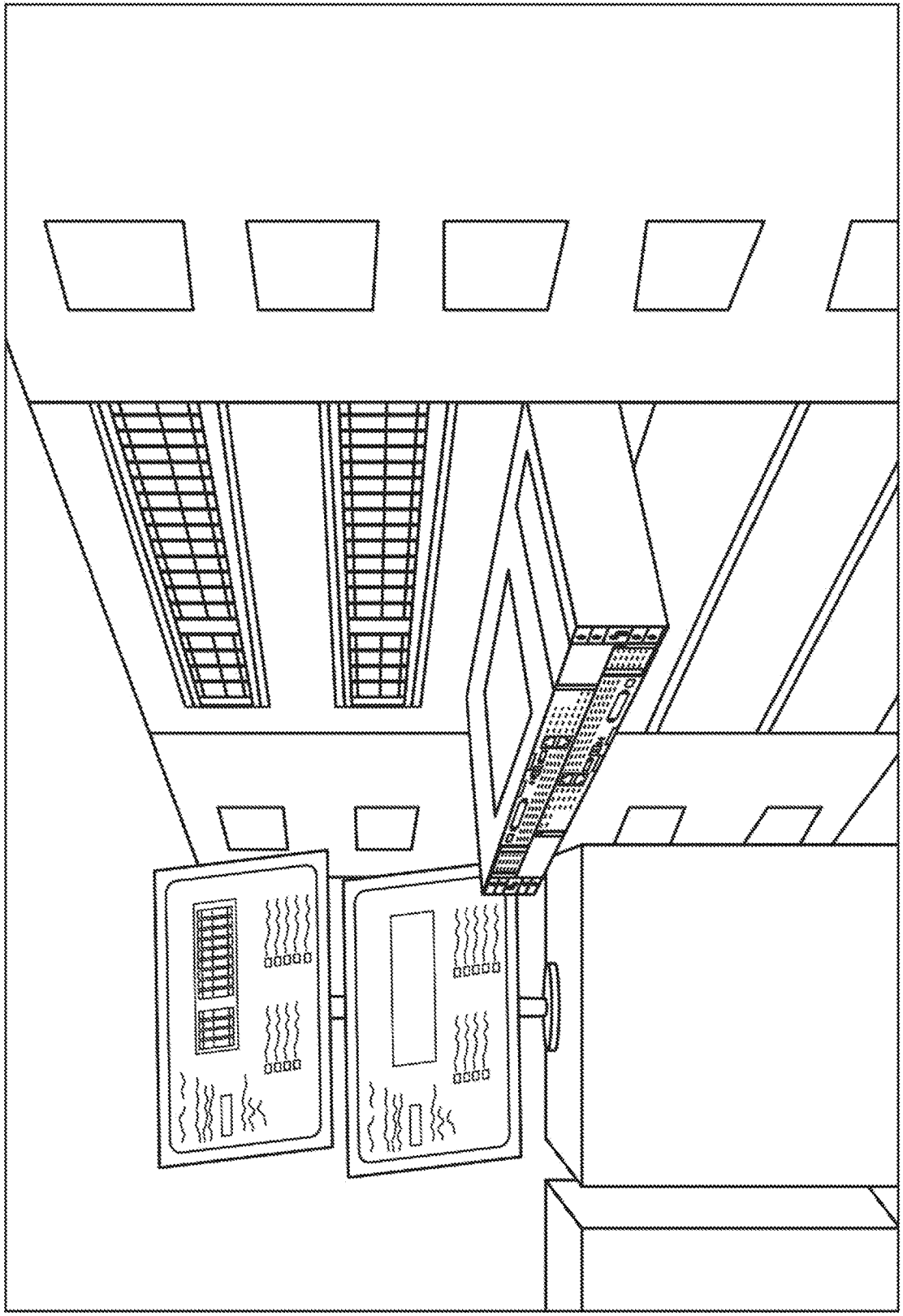
Figure 8:
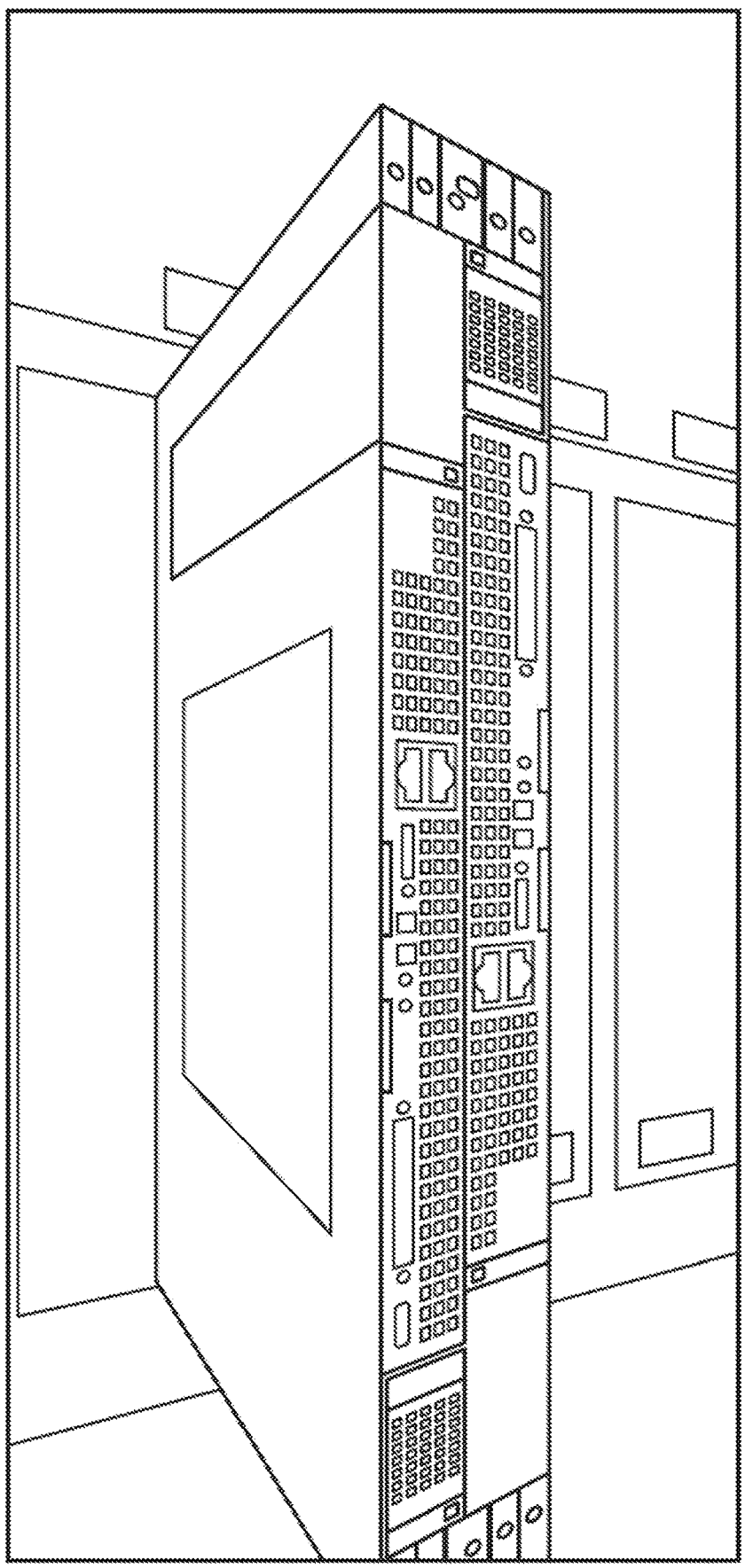
Figure 9:
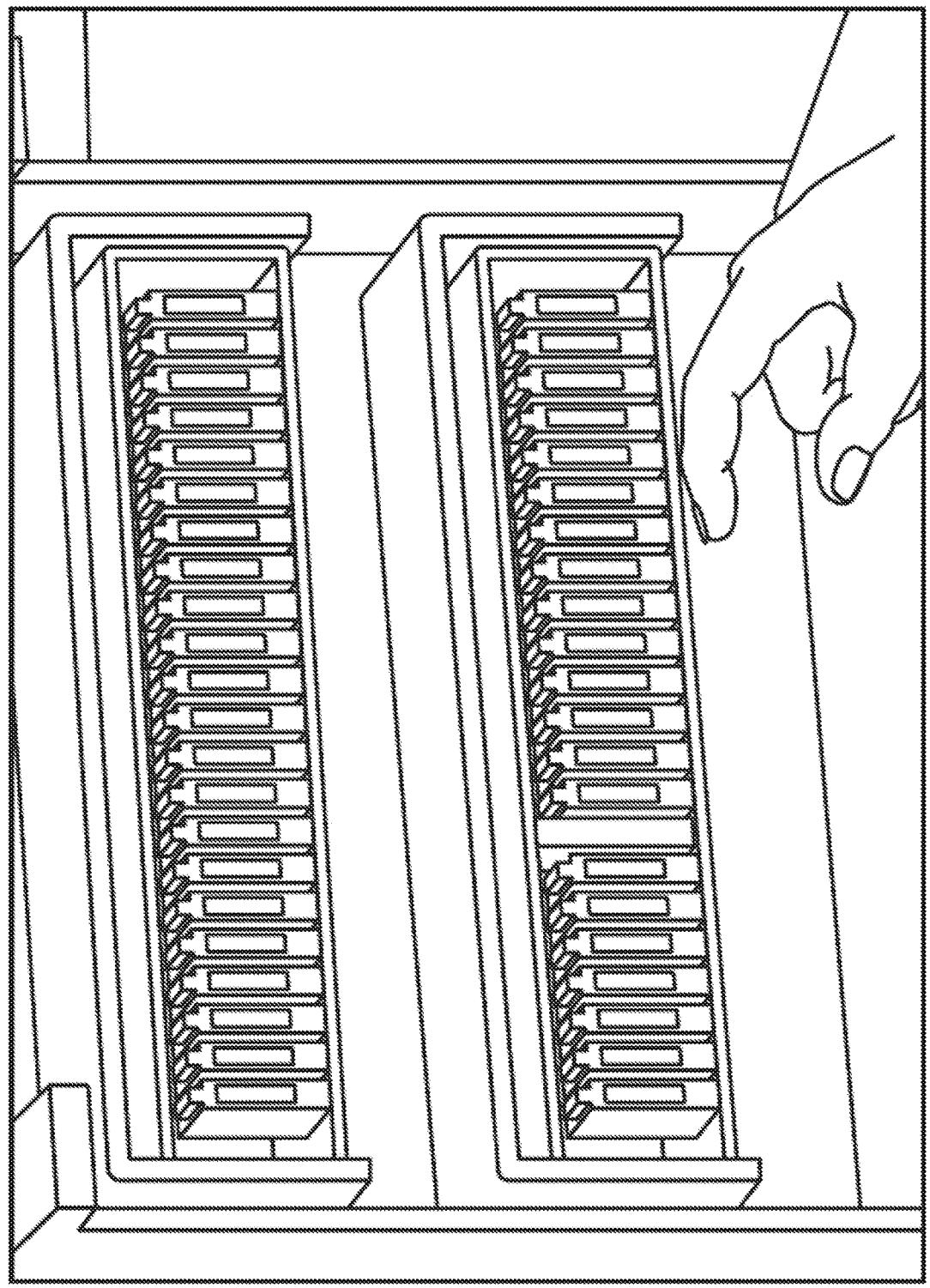
Figure 10:
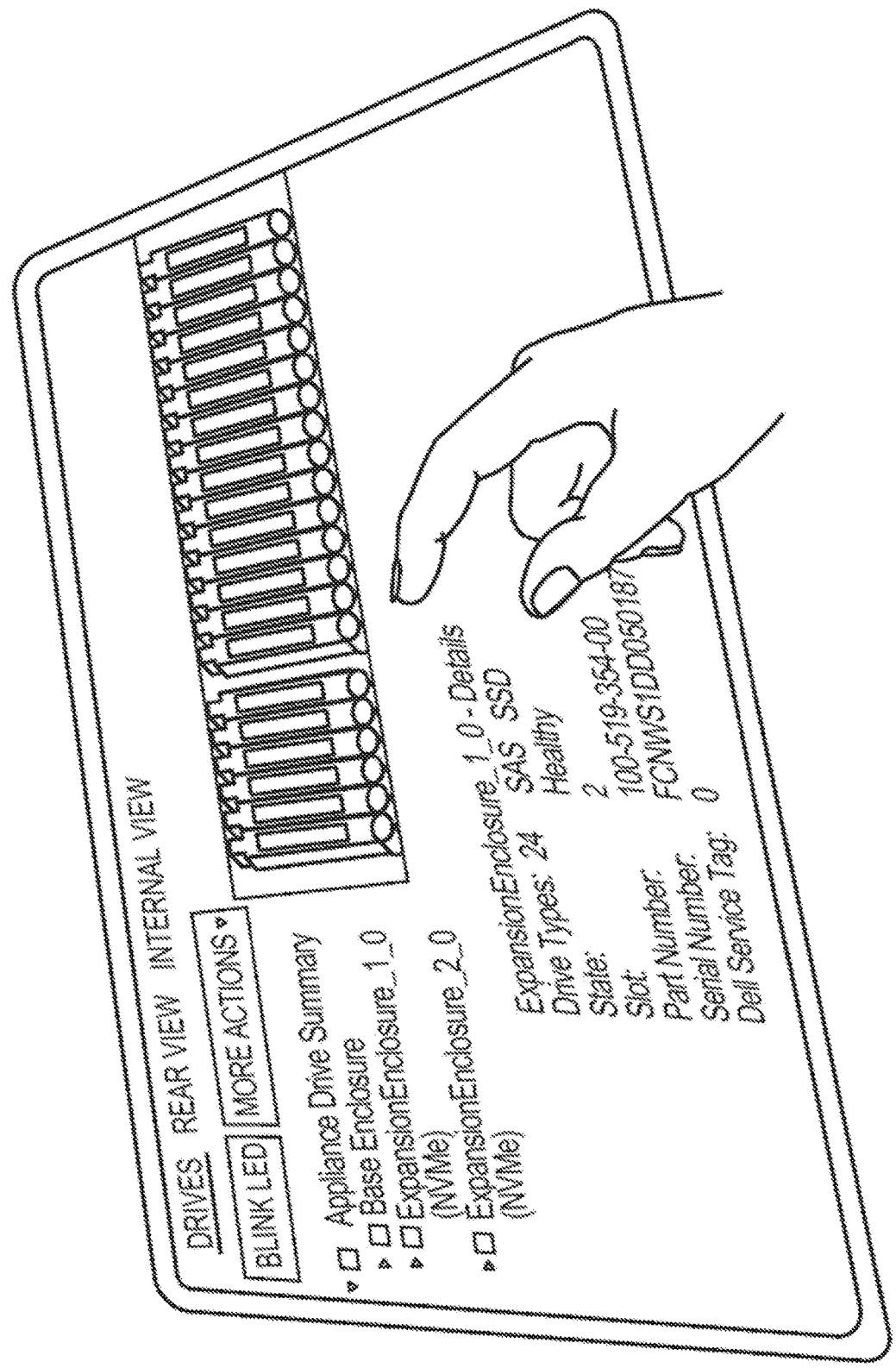
Figure 11:
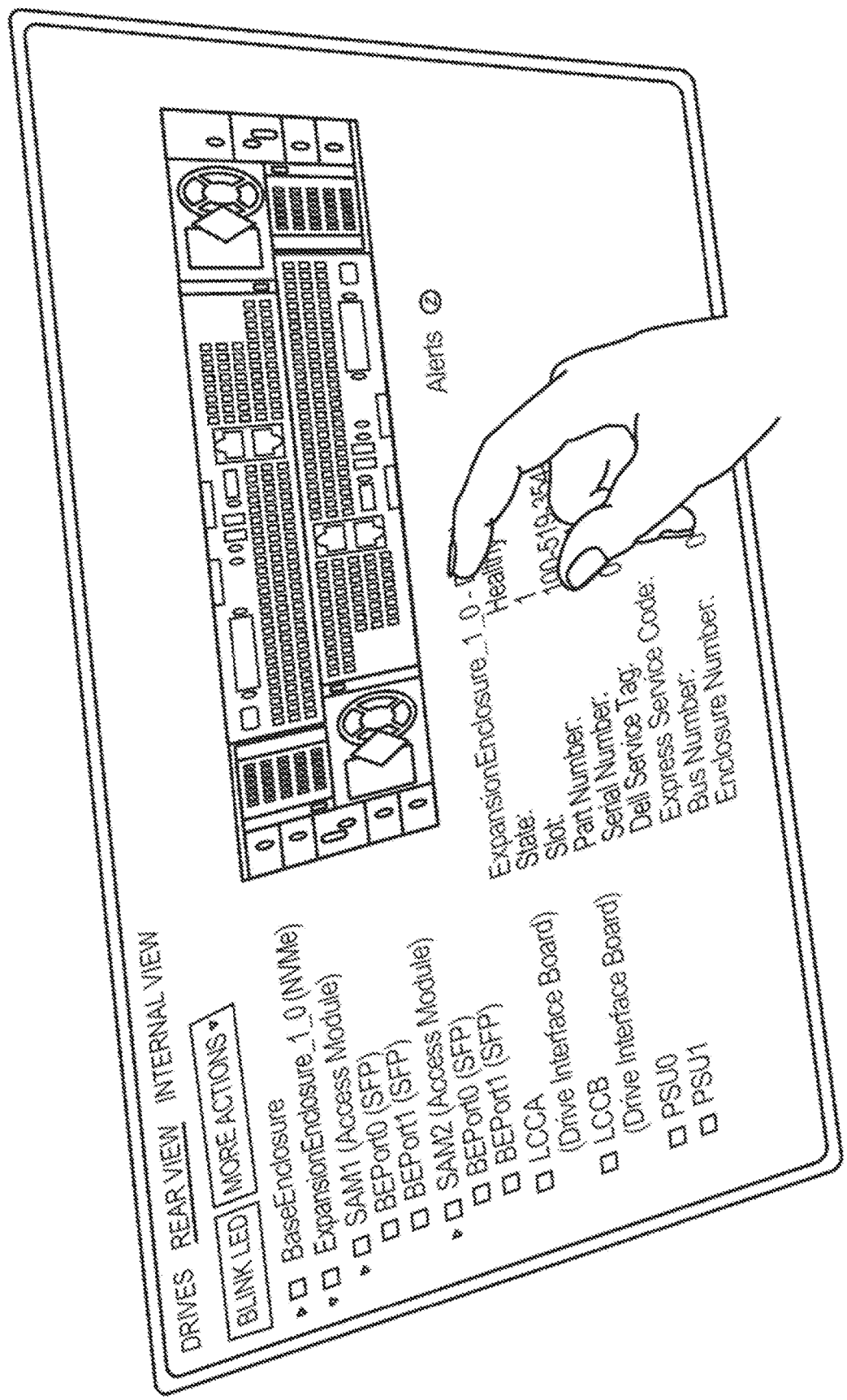

FIGS. 7-16 depict exemplary screenshots of a virtual reality environment 400 providing a simulation 418 of a storage system (e.g., a virtual reality representation of a storage system). FIG. 7 depicts a virtual server room. Three expansion shelves for a product can be seen, as well as two screens with user interfaces depicting the system status. FIG. 8 depicts the bottom expansion shelf in an extended, back-facing view. Spaces are color-coded to indicate that a part is missing. FIG. 9 show the two top expansion shelves, which are forward facing so that the drives are visible. A color-coded space indicates where a drive is missing. FIG. 10 depicts one of the user interfaces displayed on a screen in the virtual reality environment 400, alerting the user that an expansion shelf is missing a drive in a particular slot. FIG. 11 depicts the other of the user interfaces, highlighting that two power supplies are missing from the bottom expansion shelf.

Figure 12:
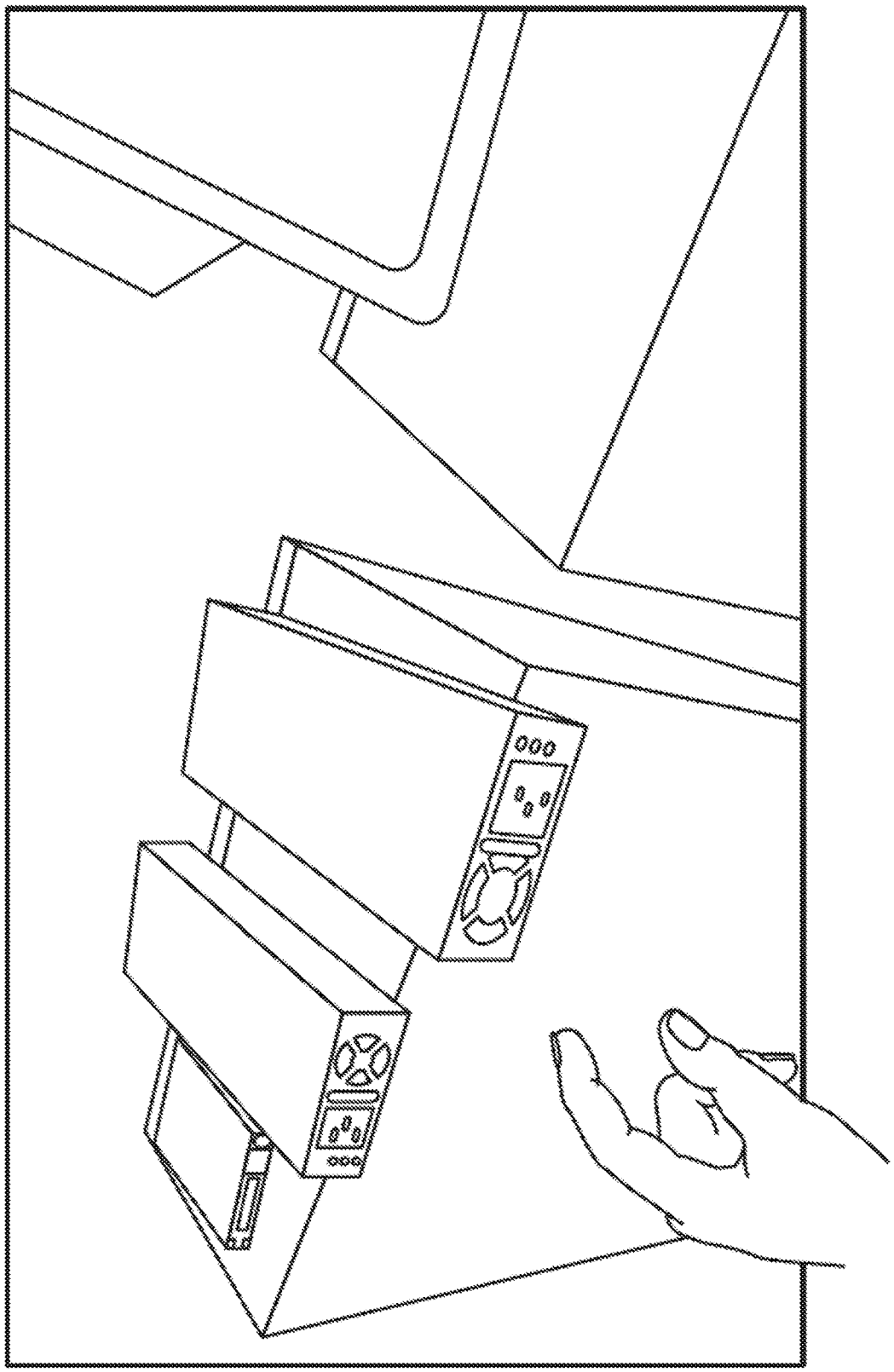
Figure 13:
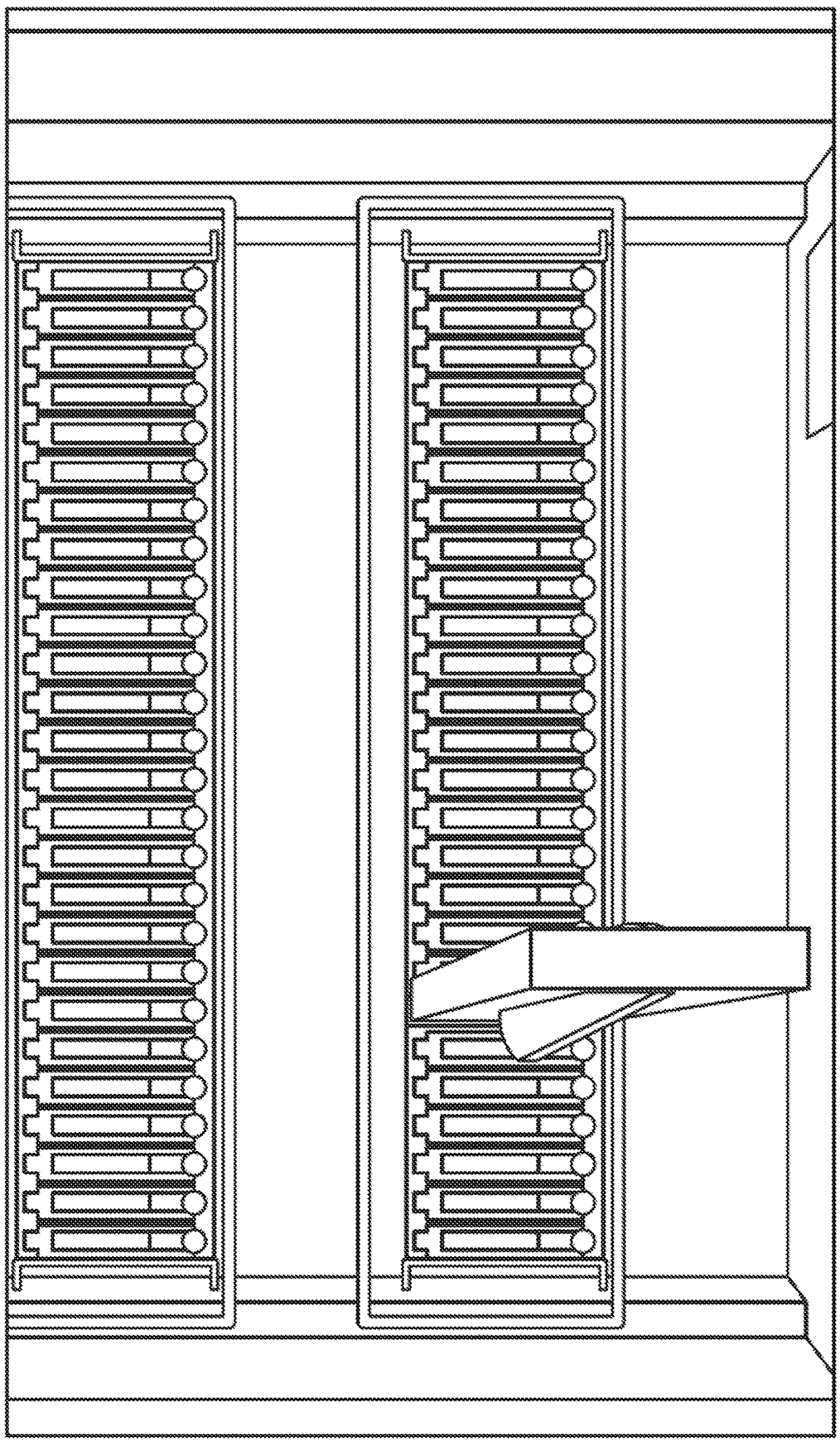
Figure 14:
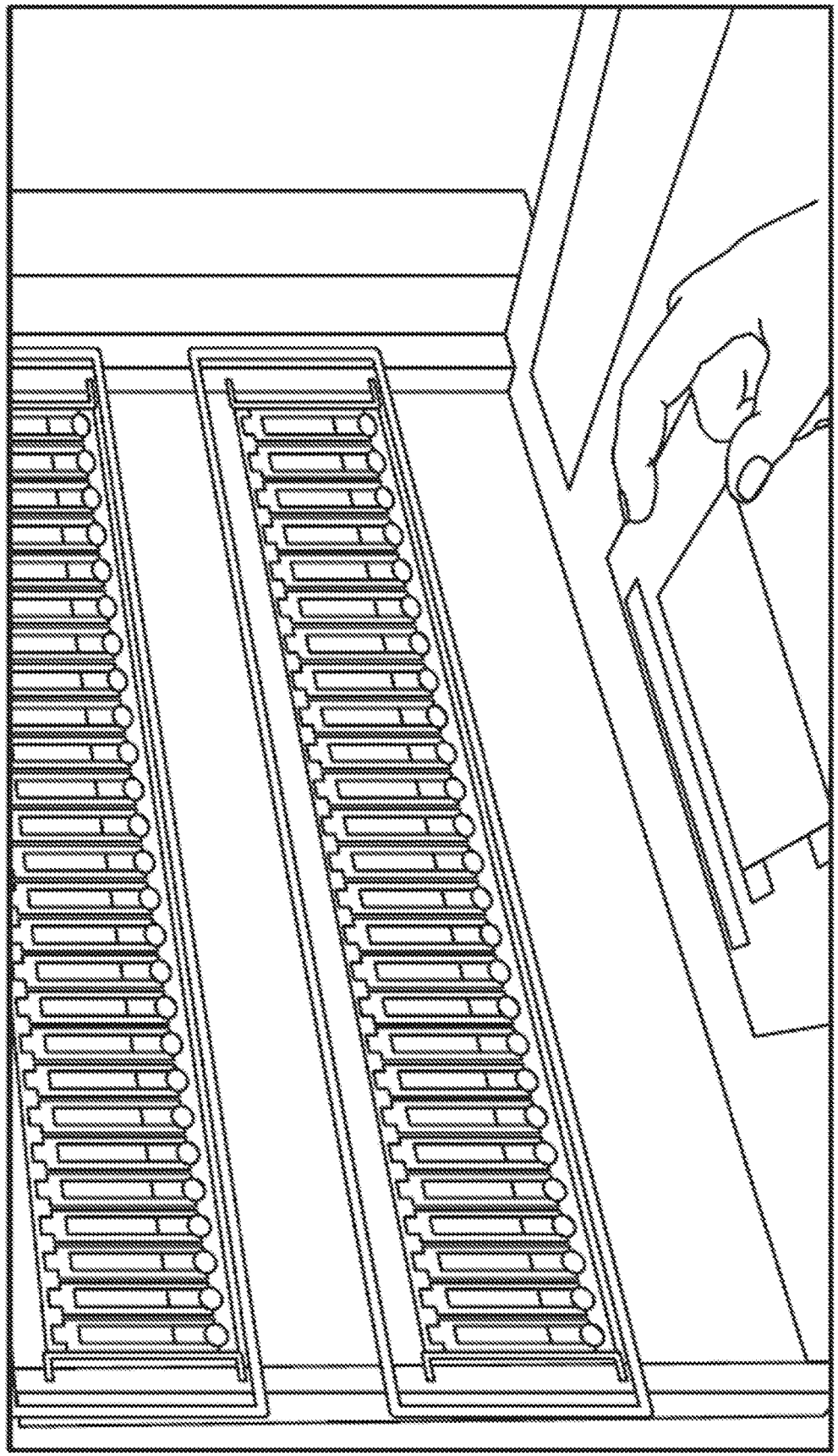

FIG. 12 depicts a solid-state drive (SSD) drive and two power supplies lying on a platform next to the screens in the virtual reality environment 400. With reference to FIGS. 4, 5, 12, 13, and 14, the user may pick up the SSD drive (FIG. 12) in the virtual reality environment 400. This action alert can correspond to state A 510a thereby beginning the series of action alerts. As shown in FIG. 13, the user may proceed to insert the SSD drive into the empty slot in the middle expansion shelf. This next action alert can trigger generation of a corresponding event state B 510b. The recommendation architecture can use the decoder 650 in an inference phase to determine that the SSD drive is close to being positioned correctly, and determine a new event state corresponding to such positioning. The recommendation architecture can generate a new event based on the new event state, which can include a guide indication encouraging the user to continue with the current series of action alerts, which should lead to the SSD drive being correctly positioned. For example, the storage system simulation can display a guide message such as "You are almost there!" in the virtual reality environment. As shown in FIG. 14, the final state X 530 is a success state corresponding to the drive snapping into place in the display.

Figure 15:
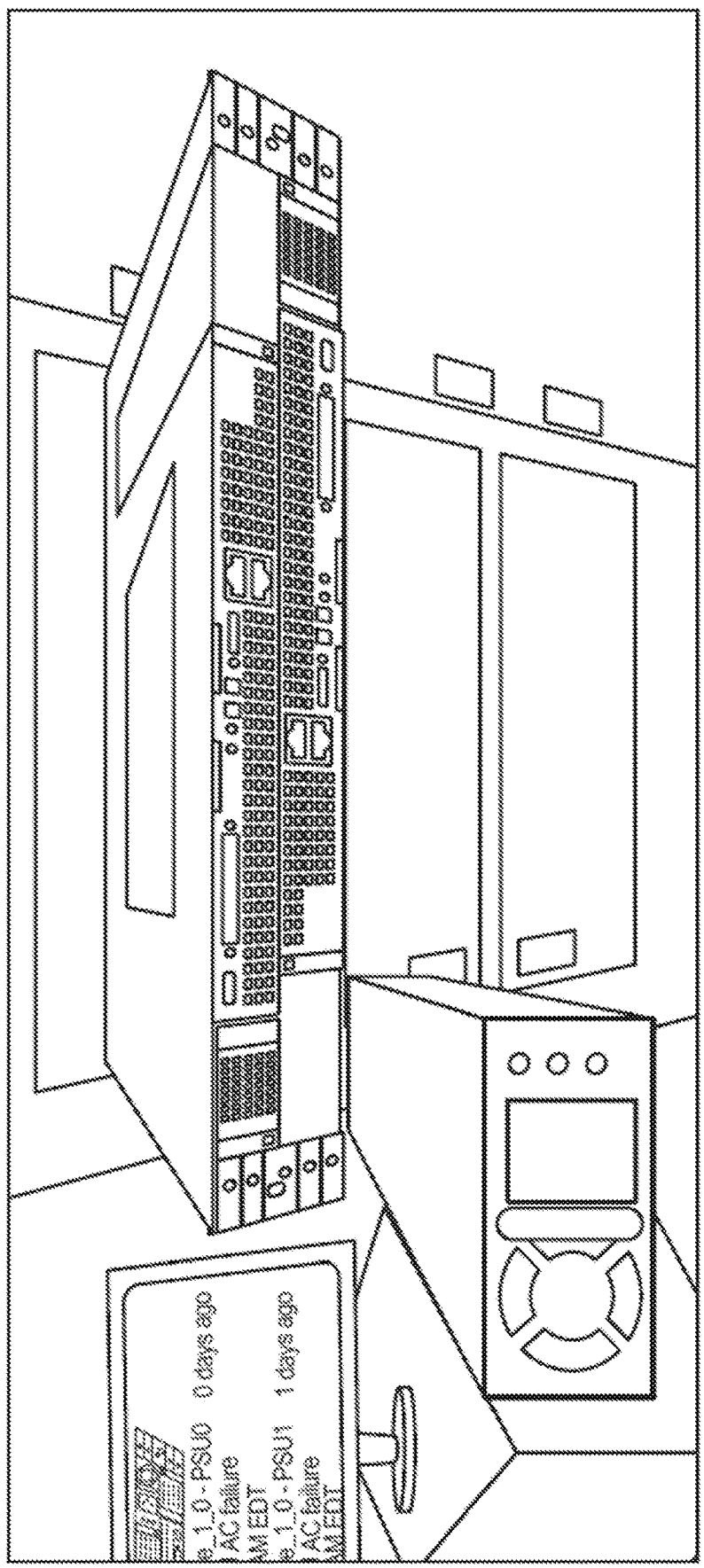
Figure 16:
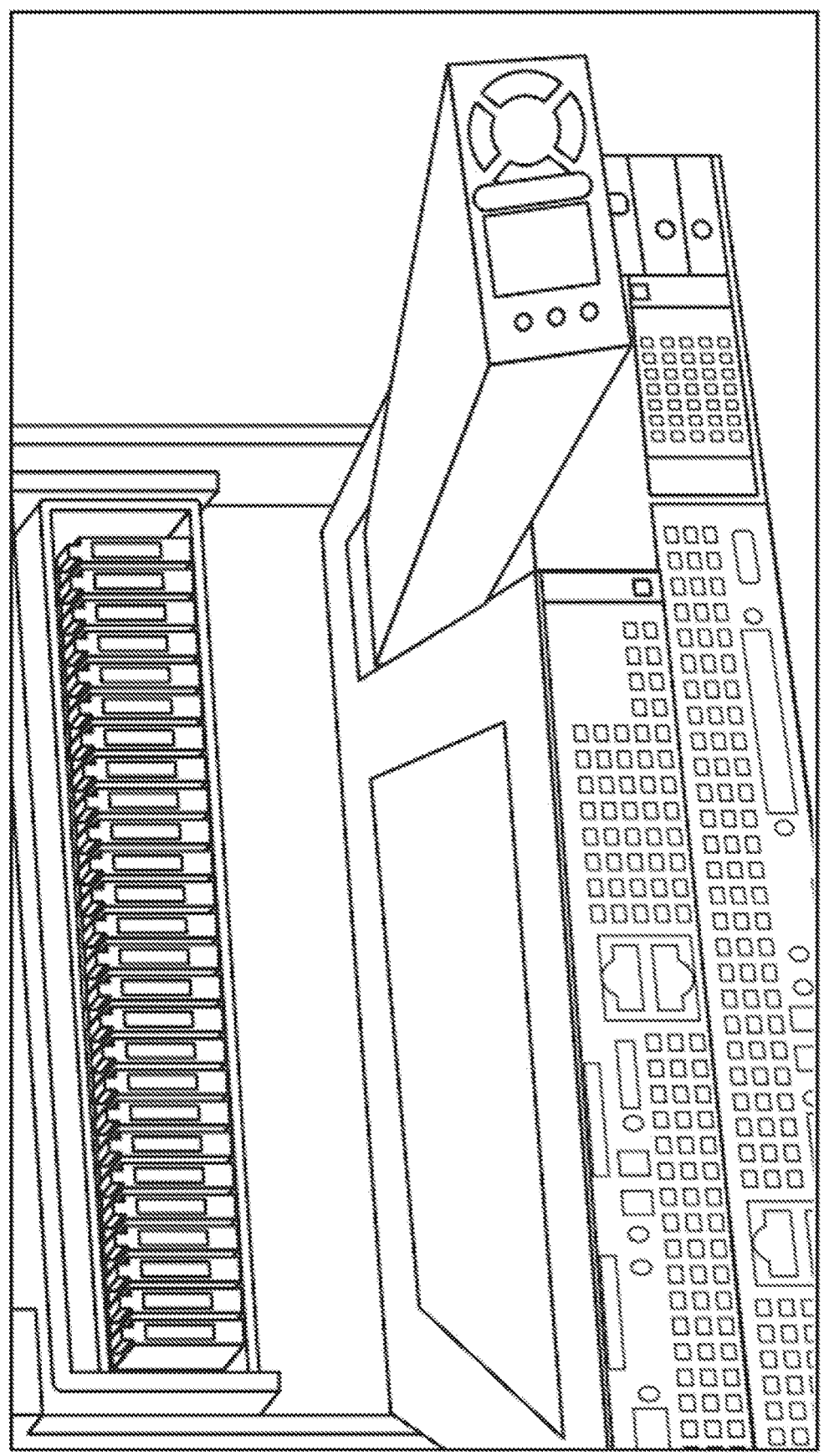

Similarly, with reference to FIGS. 4, 5, 12, 15, and 16, the user may pick up one of the power supplies (FIG. 12) in the virtual reality environment 400. This action alert can correspond to state A 510a thereby beginning the series of action alerts. As shown in FIGS. 15 and 16, the user may begin to insert a given power supply into the bottom expansion shelf. This next action alert can trigger generation of a corresponding event state B 510b. The recommendation architecture can use the decoder 650 in an inference phase to determine that the power supply is close to being positioned correctly, and determine a new event state corresponding to such positioning. The recommendation architecture can generate a new event based on the new event state, which can include a guide indication encouraging the user to continue with the current series of action alerts, which should lead to the power supply being correctly positioned. For example, the storage system simulation can display a guide message such as "You are almost there!" in the virtual reality environment. In example embodiments, the final state X 530 is a success state corresponding to the power supply snapping into place in the display.

Figure 17:
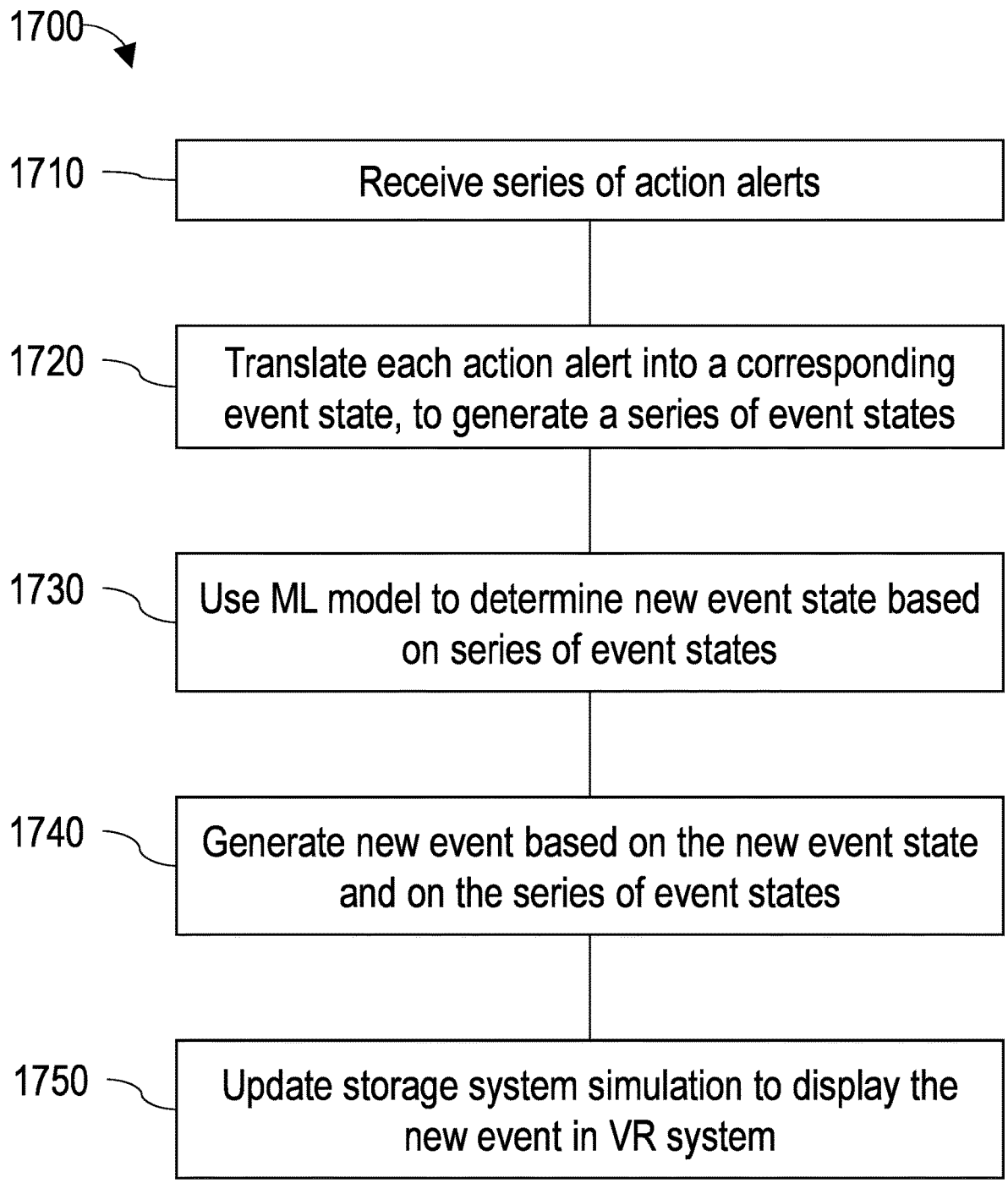

FIG. 17 illustrates an example method 1700. The method 1700 can be, for example, for simulating a storage system.

In example embodiments, the method 1700 includes receiving a series of action alerts from a virtual reality system concerning a virtual reality representation of a storage system (step 1710).

In example embodiments, the method 1700 includes translating each action alert in the action alert series into a corresponding storage system simulator event state, to generate a series of event states (step 1720). In some embodiments, the series of event states can be filtered to omit event states that are determined to be irrelevant to the storage system simulation, to identify a subset of event states.

In example embodiments, the method 1700 includes using a machine learning model to determine a new event state based on the series of event states (step 1730). For example, the machine learning model can be a language model. The language model can be trained by translating each event state in the event state series into a token in a language of the language model. Event states labeled as failures can be translated into failure tokens. Event states labeled as successes can be translated into success tokens. Each token can have an associated probability of being a next token in the language. Using the machine learning model further include: translating each event state in the series of event states into a token in the language of the language model, inferring a set of next tokens and their associated probabilities based on the translated tokens in the language, and determining the new event state based on the set of next tokens and their associated probabilities.

In example embodiments, the method 1700 includes generating a new event based on the new event state and on the series of event states (step 1740). For example, the new event can correspond to one of a stop-and-think event or a guide event for display in the virtual reality system.

In example embodiments, the method 1700 includes updating a storage system simulation corresponding to the virtual reality representation of the storage system to display the new event in the virtual reality system (step 1750).

While the various steps in the example method 1700 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example method 1700 that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

As mentioned, at least portions of the simulation system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 18. Although described in the context of the system 100, these platforms may also be used to implement at least portions of other information processing systems in other embodiments.

Figure 18:
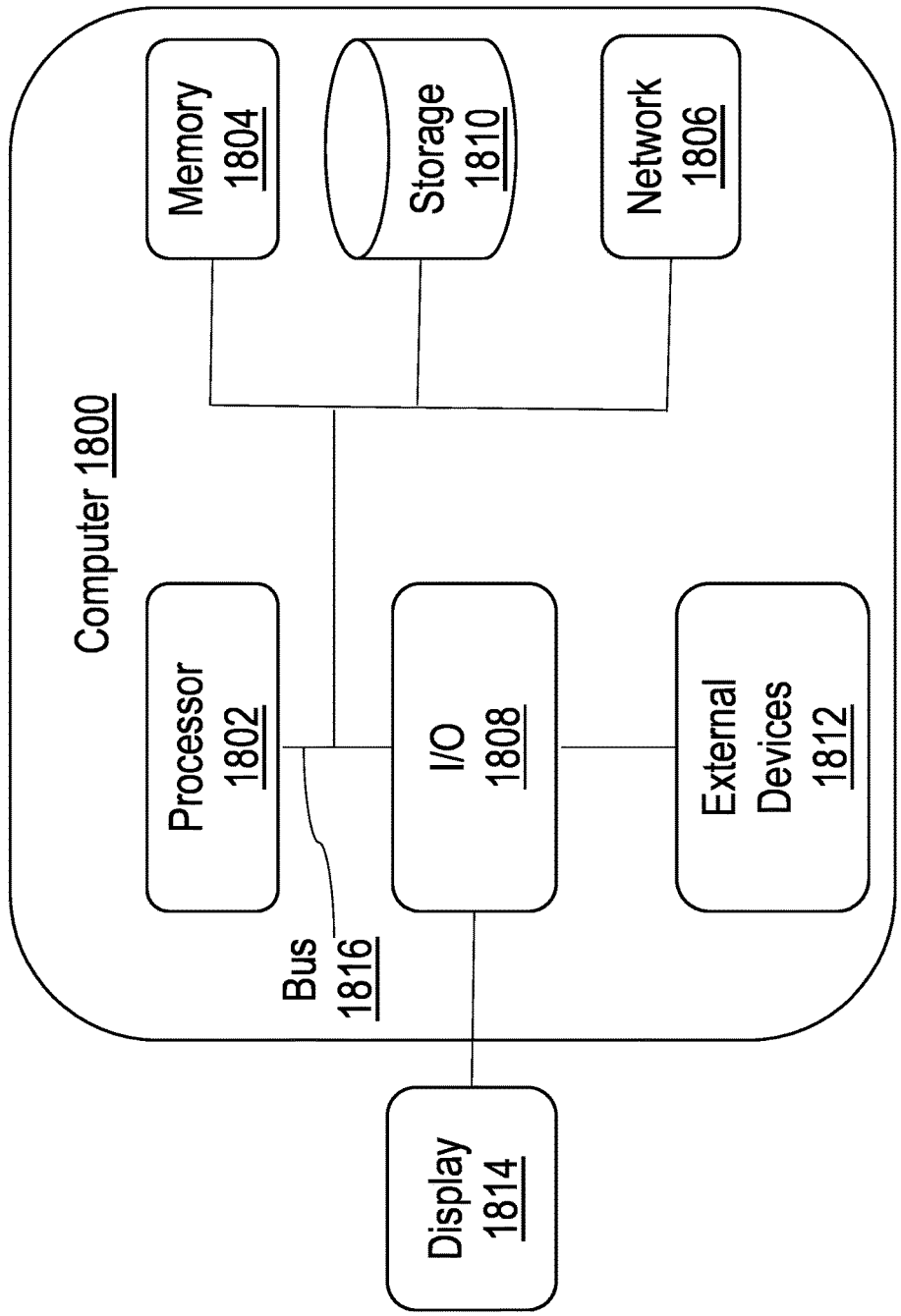

FIG. 18 illustrates aspects of a computing device or a computing system in accordance with example embodiments. The computer 1800 is shown in the form of a general-purpose computing device. Components of the computer may include, but are not limited to, one or more processors or processing units 1802, a memory 1804, a network interface 1806, and a bus 1816 that communicatively couples various system components including the system memory and the network interface to the processor.

The bus 1816 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1800 typically includes a variety of computer-readable media. Such media may be any available media that is accessible by the computer system, and such media includes both volatile and non-volatile media, removable and non-removable media.

The memory 1804 may include computer system readable media in the form of volatile memory, such as random-access memory (RAM) and/or cache memory. The computer system may further include other removable/non-removable, volatile/non-volatile computer system storage media. By way of example only, the storage system 1810 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 1816 by one or more data media interfaces. As has been depicted and described above in connection with FIGS. 1-17, the memory may include at least one computer program product having a set (e.g., at least one) of program modules that are configured to carry out the functions of the embodiments as described herein.

The computer 1800 may also include a program/utility, having a set (at least one) of program modules, which may be stored in the memory 1804 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 1800 may also communicate with one or more external devices 1812 such as a keyboard, a pointing device, a display 1814, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 1808. Still yet, the computer system may communicate with one or more networks such as a local area network (LAN), a general wide area network (WAN), and/or a public network (e.g., the Internet) via the network adapter 1806. As depicted, the network adapter communicates with the other components of the computer system via the bus 1816. It should be understood that although not shown, other hardware and/or software components could be used in conjunction with the computer system. Non-limiting examples include microcode, device drivers, redundant processing units, external disk drive arrays, RAID (Redundant Array of Inexpensive Disks) systems, tape drives, data archival storage systems, and the like.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

In the foregoing description of FIGS. 1-18, any component described with regard to a figure, in various embodiments of the invention, may be equivalent to one or more like-named components described with regard to any other figure. For brevity, descriptions of these components has not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the disclosure, ordinal numbers (e.g., first, second, third, etc.) may have been used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout this disclosure, elements of figures may be labeled as "a" to "n". As used herein, the aforementioned labeling means that the element may include any number of items and does not require that the element include the same number of elements as any other item labeled as "a" to "n." For example, a data structure may include a first element labeled as "a" and a second element labeled as "n.". This labeling convention means that the data structure may include any number of the elements. A second data structure, also labeled as "a" to "n," may also include any number of elements. The number of elements of the first data structure and the number of elements of the second data structure may be the same or different.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the invention should be limited only by the appended claims.

What is claimed is:

1. A system comprising:
    at least one processing device including a processor coupled to a memory;
    the at least one processing device being configured to implement the following steps:
        receiving a series of action alerts from a virtual reality system concerning a virtual reality representation of a storage system, the virtual reality representation of the storage system including simulated representations of solid state drives, hard drives, or storage racks in a storage system simulation, each simulated representation being interactively manipulable within the virtual reality representation to mimic physical interactions with corresponding physical storage components;
        translating each action alert in the action alert series into a corresponding storage system simulator event state, to generate a series of event states;
        using a machine learning model to determine a new event state based on the series of event states;
        generating a new event based on the new event state and on the series of event states; and
        updating the storage system simulation corresponding to the virtual reality representation of the storage system to display the new event in the virtual reality system.

2. The system of claim 1, wherein the machine learning model comprises a language model.

3. The system of claim 2, wherein the language model is trained by translating each event state in the event state series into a token in a language of the language model, wherein event states labeled as failures are translated into failure tokens, event states labeled as successes are translated into success tokens, and each token has an associated probability of being a next token in the language.

4. The system of claim 3, wherein using the machine learning model further comprises:
    translating each event state in the series of event states into a token in the language of the language model,
    inferring a set of next tokens and their associated probabilities based on the translated tokens in the language, and
    determining the new event state based on the set of next tokens and their associated probabilities.

5. The system of claim 2, wherein the language model comprises a generative pre-trained transformer model.

6. The system of claim 1, wherein the at least one processing device is further configured to filter the series of event states to omit event states that are determined to be irrelevant to the storage system simulation to identify a subset of event states.

7. The system of claim 1, wherein the new event corresponds to one of a stop-and-think event or a guide event for display in the virtual reality system.

8. A method comprising:
    receiving a series of action alerts from a virtual reality system concerning a virtual reality representation of a storage system, the virtual reality representation of the storage system including simulated representations of solid state drives, hard drives, or storage racks in a storage system simulation, each simulated representation being interactively manipulable within the virtual reality representation to mimic physical interactions with corresponding physical storage components;
    translating each action alert in the action alert series into a corresponding storage system simulator event state, to generate a series of event states;
    using a machine learning model to determine a new event state based on the series of event states;
    generating a new event based on the new event state and on the series of event states; and
    updating the storage system simulation corresponding to the virtual reality representation of the storage system to display the new event in the virtual reality system.

9. The method of claim 8, wherein the machine learning model comprises a language model.

10. The method of claim 9, wherein the language model is trained by translating each event state in the event state series into a token in a language of the language model, wherein event states labeled as failures are translated into failure tokens, event states labeled as successes are translated into success tokens, and each token has an associated probability of being a next token in the language.

11. The method of claim 10, wherein using the machine learning model further comprises:
    translating each event state in the series of event states into a token in the language of the language model,
    inferring a set of next tokens and their associated probabilities based on the translated tokens in the language, and
    determining the new event state based on the set of next tokens and their associated probabilities.

12. The method of claim 9, wherein the language model comprises a generative pre-trained transformer model.

13. The method of claim 8, further comprising filtering the series of event states to omit event states that are determined to be irrelevant to the storage system simulation to identify a subset of event states.

14. The method of claim 8, wherein the new event corresponds to one of a stop-and-think event or a guide event for display in the virtual reality system.

15. A non-transitory processor-readable storage medium having stored thereon program code of one or more software programs, wherein the program code when executed by at least one processing device causes the at least one processing device to perform the following steps:
    receiving a series of action alerts from a virtual reality system concerning a virtual reality representation of a storage system, the virtual reality representation of the storage system including simulated representations of solid state drives, hard drives, or storage racks in a storage system simulation, each simulated representation being interactively manipulable within the virtual reality representation to mimic physical interactions with corresponding physical storage components;

translating each action alert in the action alert series into a corresponding storage system simulator event state, to generate a series of event states;

using a machine learning model to determine a new event state based on the series of event states;

generating a new event based on the new event state and on the series of event states; and updating the storage system simulation corresponding to the virtual reality representation of the storage system to display the new event in the virtual reality system.

16. The processor-readable medium of claim 15, wherein the machine learning model comprises a language model, and the language model comprises a generative pre-trained transformer model.

17. The processor-readable medium of claim 16, wherein the language model is trained by translating each event state in the event state series into a token in a language of the language model, wherein event states labeled as failures are translated into failure tokens, event states labeled as successes are translated into success tokens, and each token has an associated probability of being a next token in the language.

18. The processor-readable medium of claim 17, wherein using the machine learning model further comprises:

translating each event state in the series of event states into a token in the language of the language model, inferring a set of next tokens and their associated probabilities based on the translated tokens in the language, and determining the new event state based on the set of next tokens and their associated probabilities.

19. The processor-readable medium of claim 15, further comprising filtering the series of event states to omit event states that are determined to be irrelevant to the storage system simulation to identify a subset of event states.

20. The processor-readable medium of claim 15, wherein the new event corresponds to one of a stop-and-think event or a guide event for display in the virtual reality system.

* * * * *